(12) United States Patent
Hartzstein et al.

(10) Patent No.: US 7,420,502 B2
(45) Date of Patent: Sep. 2, 2008

(54) FORWARD-LOOKING RADAR SYSTEM

(76) Inventors: Claudio Hartzstein, 30/1 Hahayl St., 43317, Ra'anana (IL); Aharon Levy, 13 Gush Halav St., 27072, Kiryat Bialik (IL); Daniel Adar, 82 Baz St., 21721, Karmiel (IL); Hanan Anderman, 14 Keshet St., 48611, Rosh Haayin (IL); Gil Shapira, 8 Netzah Yisrael St., 64352, Tel-Aviv (IL); Ehud Fishler, 4/D Bosmat St., 73142, Shoham (IL); Ilan Bitton, 4 Noga St., 34407, Haifa (IL); Amir Shmuel, 78 HaGalil St., 36001, Nofit (IL)

(*) Notice: Subject to any disclaimer, the term of this patent is extended or adjusted under 35 U.S.C. 154(b) by 11 days.

(21) Appl. No.: 10/517,281

(22) PCT Filed: Jun. 4, 2003

(86) PCT No.: PCT/IL03/00472

§ 371 (c)(1),
(2), (4) Date: Mar. 18, 2005

(87) PCT Pub. No.: WO03/104833

PCT Pub. Date: Dec. 18, 2003

(65) Prior Publication Data

US 2005/0285773 A1 Dec. 29, 2005

Related U.S. Application Data

(60) Provisional application No. 60/386,893, filed on Jun. 6, 2002.

(51) Int. Cl.
*G01S 13/93* (2006.01)

(52) U.S. Cl. .................... 342/70; 342/175; 342/71; 342/72

(58) Field of Classification Search ............. 342/70–72, 342/175
See application file for complete search history.

(56) References Cited

U.S. PATENT DOCUMENTS 4,893,126 A * 1/1990 Evans .................... 342/175

(Continued)

FOREIGN PATENT DOCUMENTS

| EP | 0 498 524 A2 | 8/1992 |
| EP | 0920071 | 6/1999 |
| JP | 60192401 | 9/1985 |
| JP | 2001-111310 A1 | 4/2001 |

OTHER PUBLICATIONS

I. Gresham, et al., A Compact Manufacturable 76-77-GHz Radar Module for Commercial ACC Applications, IEEE Transactions on Microwave Theory and Techniques, Jan. 2001, vol. 49, No. 1, pp. 44-58.

(Continued)

*Primary Examiner*—John B Sotomayor
(74) *Attorney, Agent, or Firm*—Darby & Darby PC

(57) ABSTRACT

An assembly for receiving and transmitting millimeter (mm) waves, including at least one mm wave reflector (84, 86, 88) and at least one mm transmission wave feed (72) configured in a transmission feed location (34) within the at least one mm wave reflector. The assembly also includes a plurality of receiving mm wave feeds (72) configured in respective receiving feed locations (36) within the at least one mm wave reflector; and a radio frequency (RF) module (38). The RF module is coupled to the at least one mm transmission wave feed and to the plurality of the receiving mm wave feeds, so as to drive the at least one mm transmission wave feed to transmit outgoing mm waves and to simultaneously receive incoming mm waves from all of the plurality of the receiving mm wave feeds.

22 Claims, 14 Drawing Sheets

U.S. PATENT DOCUMENTS

| | | | |
|---|---|---|---|
| 5,311,153 | A | 5/1994 | Lau et al. |
| 5,497,163 | A * | 3/1996 | Lohninger et al. ........... 342/175 |
| 5,574,426 | A * | 11/1996 | Shisgal et al. ............... 340/435 |
| 5,606,737 | A | 2/1997 | Suzuki et al. |
| 5,705,940 | A * | 1/1998 | Newman et al. .............. 326/68 |
| 5,825,333 | A | 10/1998 | Kudoh et al. |
| 5,969,580 | A | 10/1999 | Maillet et al. |
| 6,501,415 | B1 | 12/2002 | Viana et al. |
| 6,522,304 | B2 | 2/2003 | Ballantine et al. |
| 7,109,922 | B2 * | 9/2006 | Shmuel ............... 343/700 MS |
| 7,358,890 | B2 * | 4/2008 | Price et al. .................... 342/82 |
| 2003/0001772 | A1 | 1/2003 | Woodington et al. |
| 2005/0017916 | A1 * | 1/2005 | Lewry et al. ................. 343/786 |
| 2005/0122255 | A1 * | 6/2005 | Shmuel ....................... 342/175 |
| 2005/0179582 | A1 | 8/2005 | Woodington et al. |
| 2005/0190101 | A1 * | 9/2005 | Hiramatsu et al. .......... 342/175 |
| 2005/0225481 | A1 * | 10/2005 | Bonthron .................... 342/175 |
| 2005/0285773 | A1 * | 12/2005 | Hartzstein et al. ............. 342/70 |

OTHER PUBLICATIONS

M. Camiade, et al., "Full MMIC millimeter-wave-front-end for a 76.5GHz adaptative cruise control car radar", XP 10343621, 1999.
W. Thomann, et al., "Fully intergrated W-CDMA IF chip-set for UMTS mobiles", XP 10551313, 2001.

* cited by examiner

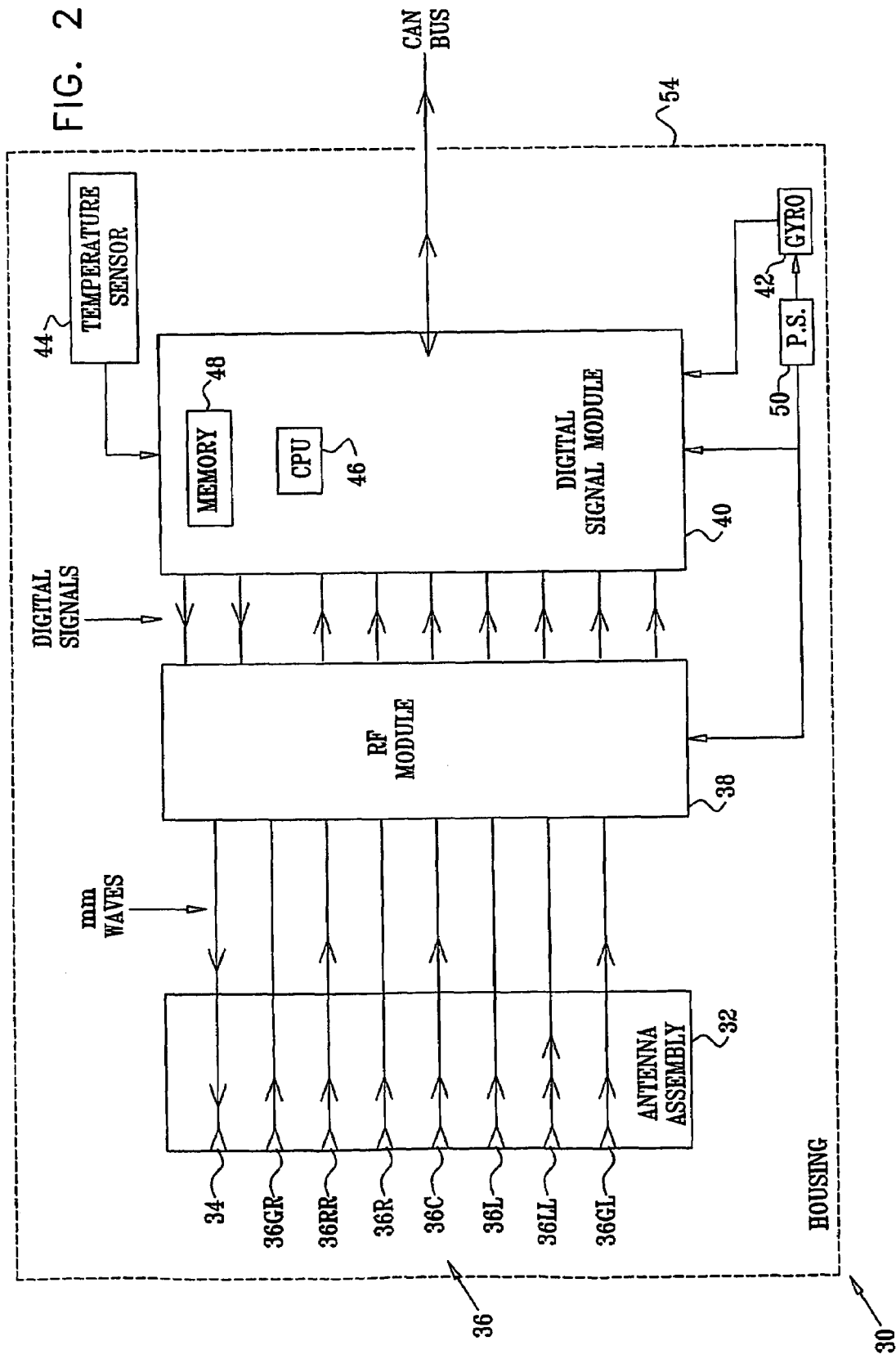

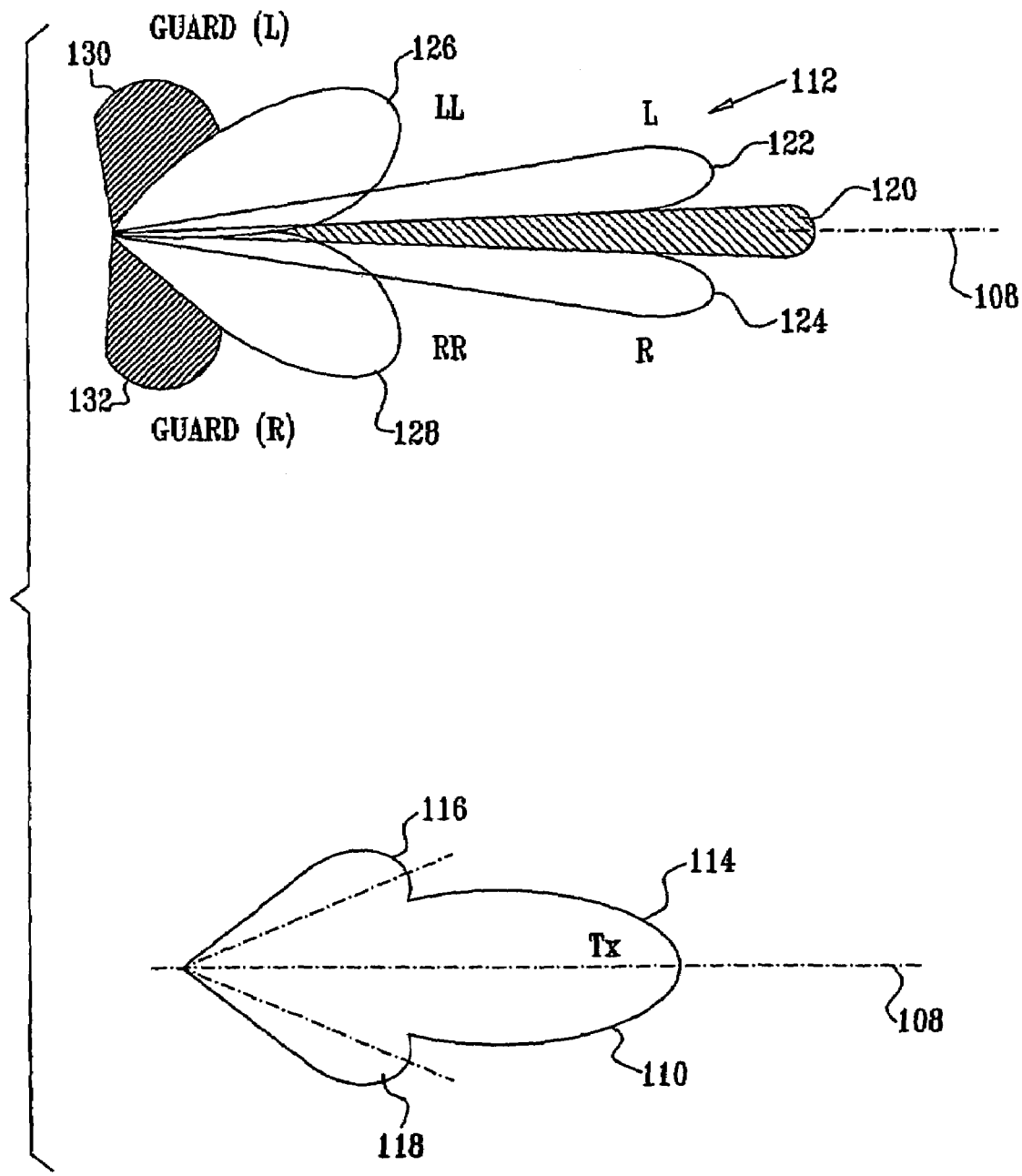

FIG. 8
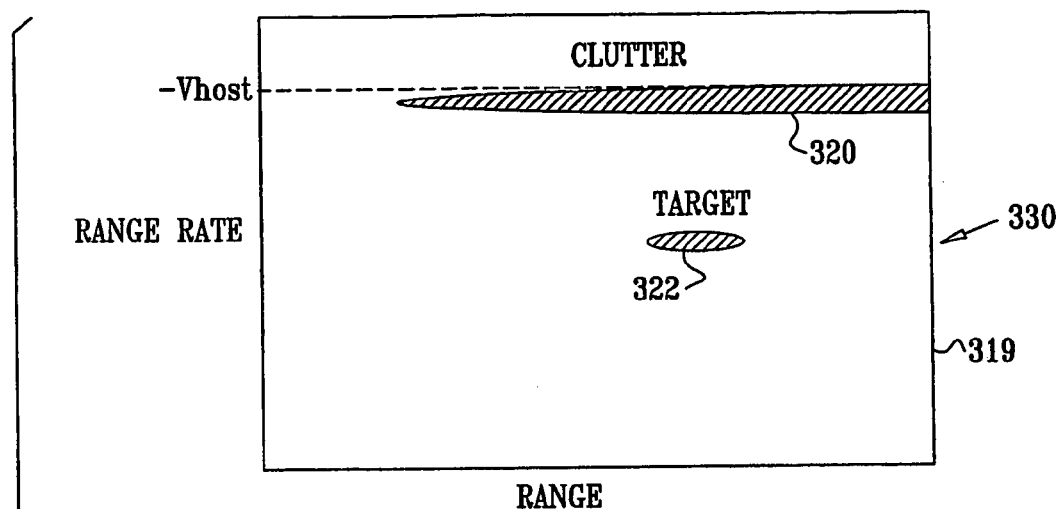
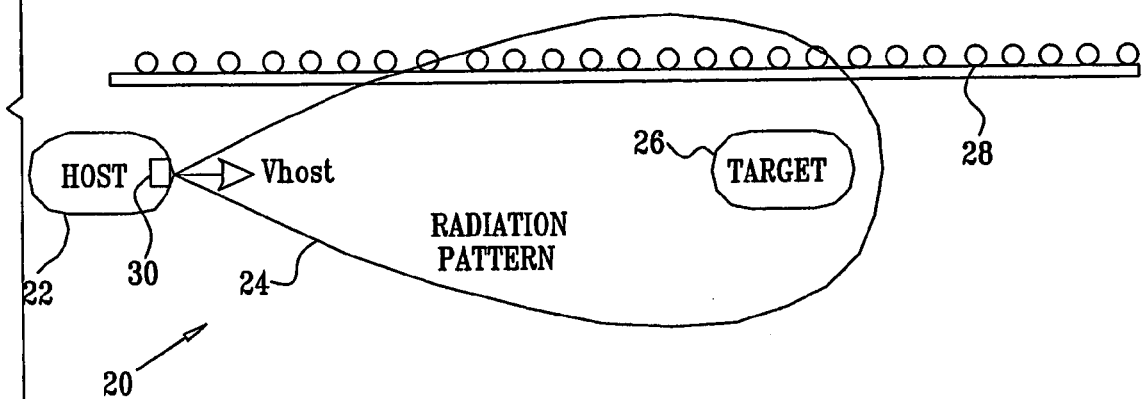
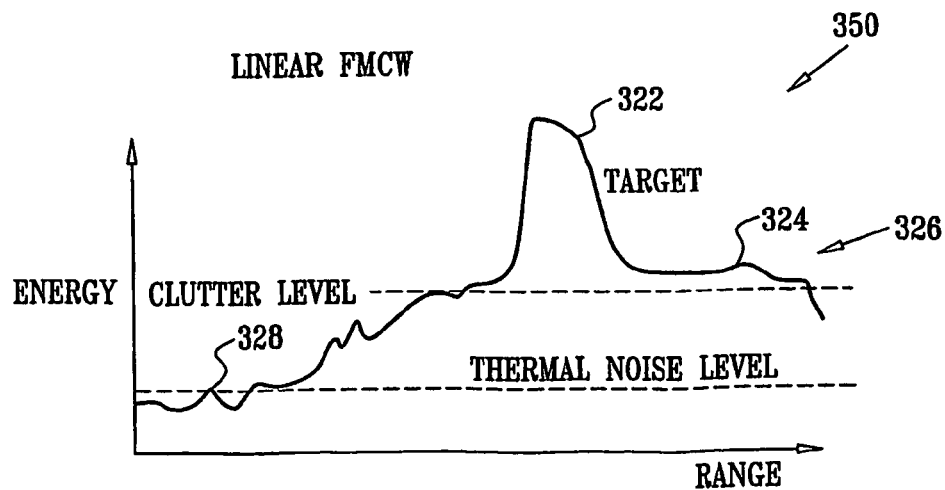

FORWARD-LOOKING RADAR SYSTEM

CROSS-REFERENCE TO RELATED APPLICATION

This application claims the benefit of U.S. Provisional Patent Application 60/386,893, filed Jun. 6, 2002, which is incorporated herein by reference.

FIELD OF THE INVENTION

The present invention relates generally to radar, and specifically to radar systems for use in vehicles.

BACKGROUND OF THE INVENTION

Radar systems operating at millimeter wavelengths have been in use for some time on vehicles, where they are installed to provide such features as warnings of objects that may not be visible to a driver of the vehicle, adaptive cruise control (ACC), or warnings of the possibility of a collision. Because of their use in vehicles, the radar systems have to comply with a large number of constraints, such as needing to operate in all weather with virtually no on-going maintenance. The systems are very sophisticated, yet need to be priced low enough for a mass market environment. Taken together, the constraints make it difficult to implement a simple, efficient radar transceiver system that is to be usable in a mass market application.

Modern vehicular radars typically require a multi-channel architecture, leading to a complex multi-function antenna and transceiver front end The complexity and stringent requirements on the individual systems typically leads to high cost solutions which limit the applicability of the technology.

Vehicular radar typically operates by transmitting a linearly frequency modulated (J) wave—"a chirp"—and receiving reflected signals from a target. The beat signal between the transmitted waveform and the received signal from a static target has a frequency $F_R$ proportional to the range R. If the target is moving relative to the sensor, at a relative velocity, herein termed range rate, $\dot{R}$, then there is an additional contribution $F_D$ to the frequency of the beat signal due to the Doppler Effect.

$$f_{beat}^{\pm} = F_R + F_D = \pm aR + b\dot{R} \quad (1)$$

where $$a = \frac{2B}{c}, b = \frac{2}{c} f_{carrier},$$

B is the bandwidth of the chirp, $f_{carrier}$ is the center frequency of the chirp, and c is the speed of light.

The + and − signs correspond to an upward and downward chirp (positive and negative slope of the LFM) respectively.

When there is a single, well defined target, then both the range and the range rate can be measured by successively transmitting two chirps (triangular waveform), one with upward slope and the second with downward slope. The frequencies of the signals received from the target are measured in each of the chirps, and the range and range rate estimated by adding and subtracting the measured frequencies:

$$R = \frac{f_{beat}^{+} - f_{beat}^{-}}{a}, \text{ and } \dot{R} = \frac{f_{beat}^{+} + f_{beat}^{-}}{b}. \quad (2)$$

This simple procedure fails when there is more than one target in the field of view. The frequency processing of each chirp results in a number of peaks, each one with its characteristic frequency. The pairing between the peaks in the two spectrums is not unique and in addition to the correct pairing, there exist a multitude of other pairing possibilities that result in non existent targets named ghosts. This situation becomes increasingly complex when the number of targets increases and it is further complicated if the targets are not strong enough to be detected in both spectra.

Many algorithms have been put forward to try to solve this shortcoming, especially in Radar Sensors for ACC systems. The safety and reliability specifications for ACC applications are very strict and therefore the probability of false alarm $P_{fa}$, and probability of misdetection $(1-P_d)$, should be kept to very low values. Prior art systems have used algorithms based on the analysis of a large number of hypotheses. The large number of hypotheses result from spectra which are generated from a number of chirps with various slopes (positives, negatives, null). These numerous and complicated algorithms lead to $P_{fa}$ and $(1-P_d)$ being very dependent on the actual scenarios in the highway, so that in different weather situations and with a large number of objects in the field of view use of the algorithms is questionable if not plainly unsafe.

SUMMARY OF THE INVENTION

It is an object of some aspects of the present invention to provide a method and apparatus for detecting objects using a forward looking radar system.

In preferred embodiments of the present invention, a forward-looking radar (FLR) unit for a vehicle comprises an antenna assembly that operates at millimeter (mm) wavelengths. The antenna assembly is configured to operate as both a receiving and as a transmitting antenna system. It comprises one or more polarization-rotating mm wave reflectors, typically three reflectors. One or more mm wave feeds, preferably eight feeds, are positioned at predefined locations within the reflectors. Typically, one of the feeds acts as a transmitting feed, and the remaining feeds act as receiving feeds. The reflectors are covered by a radome, which in addition to protecting the reflectors is configured to act as a mm wave polarizer.

Polarized transmitted waves from the transmitting feed are reflected from the radome back to the reflectors, which reflect and rotate the polarization of the transmitted waves so that they penetrate the radome. The transmitted waves exit the radome in a transmission angular-gain distribution pattern that is determined by the location of the transmitting feed in the reflectors and by the shape and orientation of the reflectors with respect to the radome. A reverse process applies to waves reflected from objects in the transmission beam and received by the antenna assembly, each receiving feed forming a respective receive angular-gain distribution pattern. The receiving feeds operate simultaneously and independently of each other. The receiving and transmission feeds are configured so that the combined receive angular-gain distribution pattern is substantially identical to the transmission angular-gain distribution pattern. The folded geometry of the assembly allows design of very shallow antennas, and the plurality of receive radiation patterns gives good angular discrimination of reflecting objects.

In some preferred embodiments of the present invention, the one or more reflectors are formed as a single molded metallic block. By molding the block at relatively low temperatures, mechanical precision of the reflectors is maintained compared to systems using hot molding, and correction work needed after the molding process is substantially reduced. As further described below, the metallic block may also be used to heat sink other components of the FLR unit.

The FLR unit further comprises an RF module upon which are mounted mm wave components that are coupled by respective waveguides to the mm wave feeds in the reflectors. The mm wave components typically generate considerable heat. The waveguides are formed as a metallic waveguide manifold, and the RF module is mounted on a back side of the manifold so that the components are aligned with their waveguides and so that they are in good thermal contact with the manifold. The reflectors are mounted on a front side of the manifold, also in good thermal contact with the manifold. The manifold thus acts as an efficient heat sink for the heat generated by the components, and the reflectors effectively also act as part of the heat sink.

In some preferred embodiments of the present invention, the RF module comprises a metal housing. Monolithic microwave integrated circuits (MMICs) are mounted within the housing, and are coupled to form a mm wave transmitter and a plurality of mm wave receivers. Feeds in the housing allow the passage of mm waves for the transmitter and the receivers, and the housing prevents passage of mm waves through the housing apart from via the feeds. The mm wave transmitter is operated by low frequency (LF) signals transferred via an LF connector through the housing. Some of the MMICs are configured as mixers, so that received mm waves are converted to lower frequencies which may also be transferred via the LF connector through the housing. The housing thus prevents leakage of mm wave radiation In order to act as a polarizer, the radome is made from insulating material substantially transparent to mm waves, on which are formed parallel conductive strips. The conductive strips are configured to act as preferential reflectors for mm wave radiation polarized in the direction of the strips. The conductive strips are also coupled to receive an electric current, typically from a battery of the vehicle, and have a resistance so that the strips act as heating elements. When used as heating elements, the strips remove ice and snow from the radome. The strips thus act both as polarizing elements and as heating elements, without reducing the efficacy of either function.

Most preferably, a yaw rate gyroscope is incorporated into the FLR unit, and is coupled to send yaw rate readout signals to a digital signal processor (DSP) comprised in the unit. The DSP, inter alia, compensates for the intrinsic rate gyro drift by means of digital processing.

The FLR unit is able to detect and track targets using either a Range-Doppler process, wherein trains of relatively large numbers of short chirps are transmitted periodically, or a linear frequency modulated continuous wave (LFMCW) process wherein trains of small numbers of longer chirps are transmitted periodically. The DSP determines the positions and the velocities of automotive targets from data received from one of the processes. In response to the measured positions and velocities, the DSP is able to switch between operating the Range-Doppler process and operating the LFMCW process. The DSP is further able to alter parameters of each of the processes to optimize detection of, and discrimination between, targets In some preferred embodiments of the present invention, the Range-Doppler process is implemented using two or more trains of chirps, each train having a different pulse repetition interval (PRI). Each train gives multiple possible velocities of the target, according to the value of the PRI of the train. The multiple possible velocities for the different trains are compared, and the true velocity of the target is determined by finding a common velocity value in the results of the different trains.

There is therefore provided, according to a preferred embodiment of the present invention, an assembly for receiving and transmitting millimeter (mm) waves, including:

at least one mm wave reflector, at least one mm transmission wave feed configured in a transmission feed location within the at least one mm wave reflector;

a plurality of receiving mm wave feeds configured in respective receiving feed locations within the at least one mm wave reflector, and a radio frequency (RF) module, which is coupled to the at least one mm transmission wave feed and to the plurality of the receiving mm wave feeds, so as to drive the at least one mm transmission wave feed to transmit outgoing mm waves and to simultaneously receive incoming mm waves from all of the plurality of the receiving mm wave feeds.

Preferably, the at least one mm transmission wave feed is characterized by a transmission angular-gain distribution pattern dependent upon the transmission feed location, and the receiving mm wave feeds are characterized by respective reception angular-gain distribution patterns dependent upon the respective receiving feed locations, so that the reception angular-gain distribution patterns form an overall reception angular-gain distribution pattern which is substantially similar to the transmission angular-gain distribution pattern.

The assembly preferably also includes a radome which is adapted to cover the at least one mm wave reflector and to interact with the outgoing mm waves so as to form the transmission angular-gain distribution pattern, and to interact with the incoming waves so as to form the overall transmission angular-gain distribution pattern Preferably, the at least one mm wave reflector, the at least one mm transmission wave feed, the plurality of receiving mm wave feeds, and the RF module, are adapted to be mounted as a unit on an automotive vehicle.

Further preferably, the at least one mm wave reflector, the plurality of receiving mm wave feeds, and the RF module are fixed to a housing that is adapted to be fixed to a vehicle, and the assembly includes a gyroscope that is coupled to the housing and that is adapted to measure a yaw rate of the vehicle.

There is further provided, according to a preferred embodiment of the present invention, an antenna system mount, including:

a radio frequency (RF) module which is adapted to transmit and receive millimeter (mm) waves and as a consequence generates RF-module-heat;

one or more mm wave reflectors; and a metallic manifold including a plurality of waveguides therein and upon which is mounted the RF module and the mm wave reflectors, so that the plurality of waveguides convey the mm waves between the RF module and the mm wave reflectors, and so that the manifold acts as a heat sink for the RF-module-heat.

Preferably, the RF module includes an RF housing having mm wave components operative therein so as to generate the RF-module-heat, and the RF housing is coupled to the metallic manifold so as to transfer the RF-module-heat thereto.

There is further provided, according to a preferred embodiment of the present invention, a radome, including:

an insulating cover adapted to cover a mm wave transceiver and which is substantially transparent to mm waves transmitted and received by the transceiver; and a plurality of substantially parallel conductive strips formed on the insulating cover so as to polarize the mm waves and which are coupled to receive an electric current and to heat the insulating cover in response to the current.

The radome preferably includes a unit wherein the insulating cover and the plurality of substantially parallel conductive strips formed thereon are mounted, and the unit is adapted to be mounted on an automotive vehicle.

There is further provided, according to a preferred embodiment of the present invention, a transceiver, including:

a housing, adapted to be mounted on an automotive vehicle, the housing comprising a transmit port, which is adapted to be coupled to a transmit feed, and a multiplicity of receive ports, which are adapted to be coupled to respective receive feeds, wherein the housing is adapted to prevent passage of millimeter (mm) waves other than through the transmit and receive ports; and a plurality of monolithic microwave integrated circuits (MMICs), which are mounted in the housing and are coupled together so as to transmit outgoing mm waves via the transmit port and so as to receive incoming mm waves in a multiplicity of mm wave channels via the receive ports.

Preferably, the plurality of MMICs include one or more mixers which receive the incoming waves and a portion of the outgoing mm waves and in response generate baseband signals, and wherein the housing includes a connector which transfers the baseband signals outside the housing while preventing passage of mm waves.

There is further provided, according to a preferred embodiment of the present invention, a forward-looking radar system, including:

a millimeter (mm) wave transceiver, which is adapted to transmit mm waves toward a target and to receive the mm waves reflected from the target so as to provide signals in response to the reflected waves, the transceiver having a first state in which the transceiver transmits and receives the mm waves in accordance with a Range-Doppler process, and a second state in which the transceiver transmits and receives the mm waves in accordance with a linear frequency modulated continuous wave (LFMCW) process; and a processing module, which is coupled to process the signals so as to determine a position and a velocity of the target, and which is adapted, in response to the position and the velocity, to switch the transceiver between the first state and the second state.

The system preferably includes a unit wherein the mm wave transceiver and the processing module are mounted, wherein the unit is adapted to be mounted on an automotive vehicle, and wherein the target comprises an automotive target.

Preferably, the Range-Doppler process includes:

transmitting a first train of mm wave single-slope chirps from the automotive vehicle, the first train having a first pulse repetition interval (PRI);

receiving first mm reflected waves from the automotive target at the automotive vehicle in response to the first train;

generating first signals in response to the first mm reflected waves;

determining from the first signals a first plurality of possible velocities of the automotive target;

transmitting a second train of mm wave single-slope chirps from the automotive vehicle, the second train having a second PRI different from the first PRI;

receiving second mm reflected waves from the automotive target at the automotive vehicle in response to the second train;

generating second signals in response to the second mm reflected waves;

determining from the second signals a second plurality of possible velocities of the automotive target, and correlating the first and second pluralities of possible velocities to determine a true velocity of the automotive target Alternatively or additionally, the Range-Doppler process includes:

transmitting a train of mm wave single-slop chirps having multiple frequencies from the automotive vehicle;

receiving reflected mm waves from the automotive targets in response to the chirp;

mixing the reflected mm waves with the frequencies of the chirps in order to determine beat frequencies;

performing a plurality of Fast Fourier Transforms (FFT) sequentially on the beat frequencies to determine transformed values; and determining the position and the velocity of the automotive target in response to the transformed values.

Preferably, the automotive target includes a first and a second automotive target, and the LFMCW process includes:

transmitting toward the automotive targets a sequence of mm wave positive single-slope chirps, each of the chirps comprising multiple frequencies;

receiving reflected mm waves from the automotive targets in response to the chirps;

mixing the reflected mm waves with the frequencies of the chirps in order to determine beat frequencies; and determining a position and a velocity of the first automotive target and a position and a velocity of the second automotive target in response to the beat frequencies.

Preferably, determining the position and velocity of the first and second automotive targets includes maintaining a track file including the positions of the first and second automotive targets and determining the velocities of the first and second automotive targets by evaluating differences of the positions.

Further preferably, maintaining the track file includes evaluating initial positions of the first and second automotive targets after an initial chirp comprised in the sequence of chirps, and evaluating subsequent positions of the first and second automotive targets after a subsequent chirp included in the sequence of chirps, and wherein determining the velocities comprises evaluating differences between the subsequent and the initial positions, and comparing the differences to a time between the initial and the subsequent chirp.

There is further provided, according to a preferred embodiment of the present invention, a method for tracking a first and a second target, including:

transmitting toward the targets a sequence of millimeter (mm) wave chirps, each of the chirps comprising multiple frequencies and having substantially identical positive single-slopes;

receiving reflected mm waves from the targets in response to the chirps;

mixing the reflected mm waves with the frequencies of the chirps in order to determine beat frequencies; and determining a position and a velocity of the first target and a position and a velocity of the second target in response to the beat frequencies.

Preferably, transmitting the sequence of mm wave chirps includes transmitting an initial chirp and a subsequent chirp, and determining the position and the velocity of the first target and of the second target includes determining an initial position of the first target and an initial position of the second target in response to the initial chirp, and determining a subsequent position of the first target and a subsequent position of the second target in response to the subsequent chirp, and determining the velocity of the first target in response to the initial position and subsequent position of the first target and the velocity of the second target in response to the initial position and subsequent position of the second target.

Further preferably, determining the position and the velocity of the first target includes maintaining a track file including a previous position and a previous velocity of the first target, and finding a predicted position and a predicted velocity of the first target in response to the previous position and the previous velocity, and comparing the predicted position and the predicted velocity with a resultant position and a resultant velocity of the first target determined from the beat frequencies.

There is further provided, according to a preferred embodiment of the present invention, a method for producing a reflector for a millimeter (mm) wave antenna, including:

molding the reflector at a molding temperature sufficiently close to an operating temperature of the reflector so that changes of dimensions of the reflector due to a change from the production temperature to the operating temperature cause no substantial change in action of the reflector on the mm waves.

Preferably, molding the reflector includes molding the reflector using thixo-molded magnesium.

Further preferably, the reflector includes a plurality of reflecting apertures, and molding the reflector includes molding the plurality of reflecting apertures as a single metallic block The present invention will be more fully understood from the following detailed description of the preferred embodiments thereof, taken together with the drawings, a brief description of which follows.

BRIEF DESCRIPTION OF THE DRAWINGS

FIG. 2 is a schematic block diagram of the FLR unit of FIG. 1, according to a preferred embodiment of the present invention;

FIG. 4 illustrates schematic transmit and receive azimuthal angular-gain radiation distribution patterns for the antenna assembly of FIG. 3, according to a preferred embodiment of the present invention;

FIG. 8 is a schematic diagram illustrating two processes for detecting targets used by the FLR unit of FIG. 1, according to a preferred embodiment of the present invention.

DETAILED DESCRIPTION OF PREFERRED EMBODIMENTS

Figure 1:
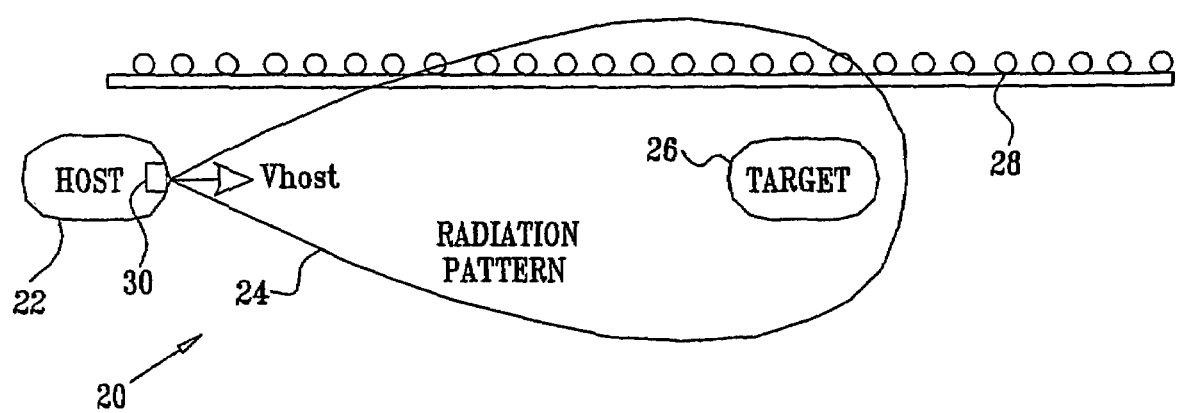
FIG. 1 is a schematic block diagram illustrating use of a forward-looking radar (FLR) unit, according to a preferred embodiment of the present invention.

Reference is now made to FIG. 1, which is a schematic block diagram illustrating use of a forward-looking radar (FLR) unit 30, according to a preferred embodiment of the present invention. FLR unit 30 is preferably mounted on the front of a vehicle 22, and is used to determine moving objects in and near to the path of the vehicle, such as a vehicle 26, herein termed the target vehicle. Unit 30 is also able to detect stationary objects, such as a guard rail 28, in and near to the path of the host vehicle. All such moving and stationary entities that are detectable by FLR unit 30, such as animals, pedestrians, bicycles, cyclists, and those objects exemplified by vehicle 26 and guard rail 28, are herein referred to as automotive targets. Alternatively or additionally, FLR unit 30 may be mounted on the back or side of a vehicle, so as to detect moving or stationary objects behind or beside the vehicle. By way of example, unit 30 is assumed to be mounted on the front of vehicle 22, which is hereinbelow also termed the host vehicle.

Unit 30 generates an antenna radiation beam pattern 24, and makes range, azimuth, and velocity measurements on each object detected, tracks the objects, compares object tracks with a predicted path of the host vehicle, and allocates a level of importance to each of the objects. The level of importance enables the unit to make a judgment as to a most important object (MIO) amongst those detected. By identifying the MIO, and also from the tracks of the other objects, the unit is able to issue MIO measurements and additional signals to the host vehicle, or a driver of the host vehicle.

FIG. 2 is a schematic block diagram of FIR unit 30, according to a preferred embodiment of the present invention. Unit 30 comprises an antenna assembly 32, which acts as a transmitter and receiver of millimeter (mm) electromagnetic waves. References to mm waves herein are assumed to be for waves having frequencies of the order of W-band frequencies. As described in more detail below, assembly 32 transmits forward mm waves so as to cover a range of angles in front of the host vehicle, and the waves are reflected by objects in front of, and to the side of, the vehicle back to the unit, where they are received by the assembly. Assembly 32 preferably comprises one transmitting antenna feed 34, and a plurality, hereinbelow assumed to be seven, of receiving antenna feeds 36GL, 36LL, 36L, 36C, 36R, 36RR, and 36GR, herein also referred to generically as feeds 36. Alternatively, assembly 32 may comprise more than one transmitting antenna feed, and a different number of receiving antenna feeds. In some preferred embodiments of the present invention, an eighth elevation input feed is used, preferably to detect objects which are outside a generally horizontal plane defined by feeds 36. It will be appreciated that FLR unit 30 may comprise numbers of feeds other than seven or eight. Hereinbelow, unless otherwise stated, FLR unit is assumed to use seven receive feeds.

Antenna assembly 32 is coupled to a radio-frequency (RF) module 38, which generates and supplies the transmitted mm waves for the antenna assembly, and which also receives respective reflected mm wave signals from the receiving antenna feeds. Preferably, RF module 38 converts each received signal in a direct homodyne arrangement, by mixing the respective received signals with a portion of the transmitted wave, to seven baseband signals. Alternatively, RF module converts each of the received signals first in a heterodyne arrangement to seven intermediate frequency (IF) signals, and then uses a homodyne arrangement to generate the baseband signals. Module 38 amplifies then digitizes the baseband signals, and the digitized values are conveyed to a digital signal module 40. In preferred embodiments of the present invention, the multiple received signals are sampled and processed simultaneously and independently of each other, unlike prior art systems where the sampling of multiple received signals may be switched between the signals.

Module 40 acts as a computation platform for unit 30, and is coupled to a host vehicle bus, preferably a Controller Area Network (CAN) bus, so as to receive information concerning the host vehicle via the bus. In addition, module 40 monitors one or more temperature sensors 44, external to and within unit 30, and other sensors such as speed sensors for host vehicle 22, as well as a gyroscope 42 that measures a yaw rate of the host vehicle. Module 40 comprises a memory 48 wherein is stored software, which, together with a digital signal processor (DSP) 46 that acts as a central processing unit (CPU), enable the module to perform initial processing of the digital signals received from RF module 38, and perform algorithms for analyzing the data received by the module. Computations performed by module 40, including processing of the algorithms, most preferably run in real-time, so that the algorithm results may be provided to the host vehicle or the driver in real-time. A unit housing 54 contains assembly 32, module 38, and module 40. Housing 54 also comprises a powers supply 50 for the modules.

Figure 3A:
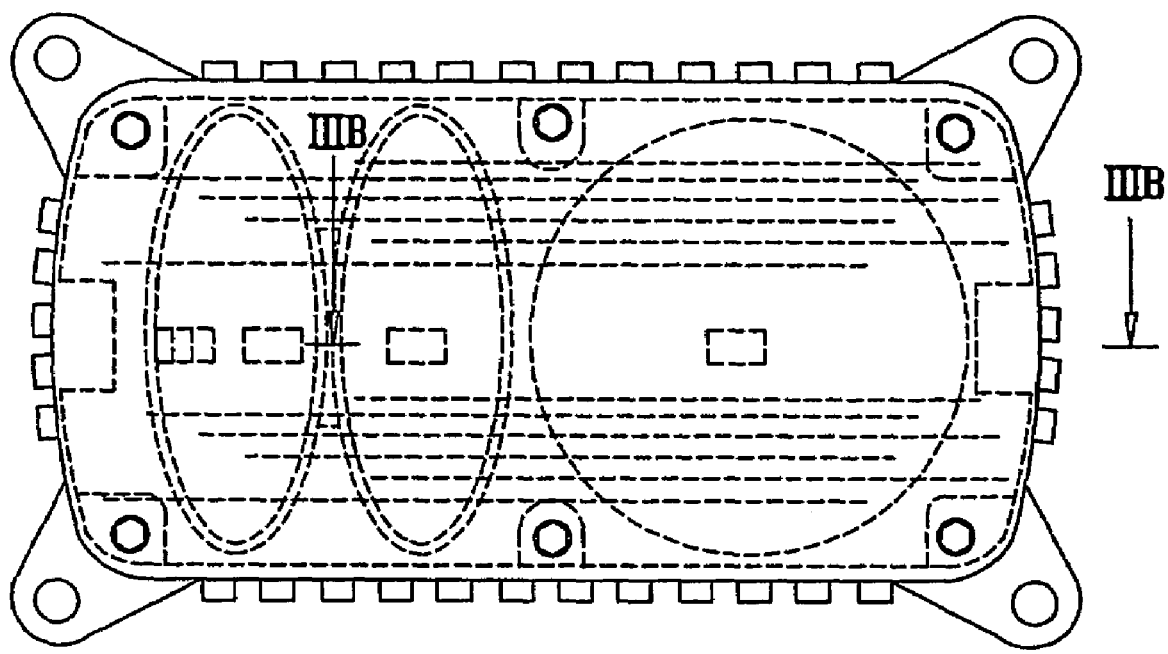
FIGS. 3A, 3B, and 3C are schematic diagrams of an antenna assembly, according to a preferred embodiment of the present invention.
Figure 3B:
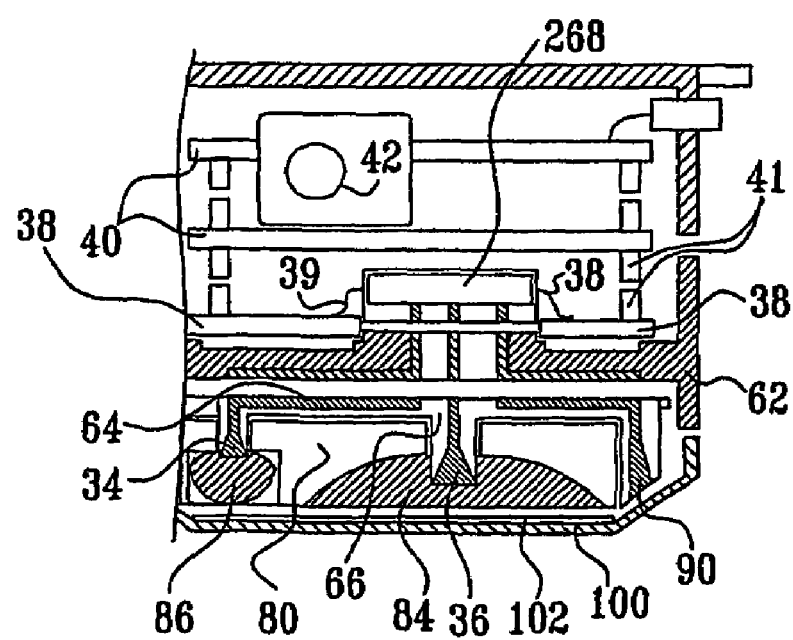
Figure 3C:
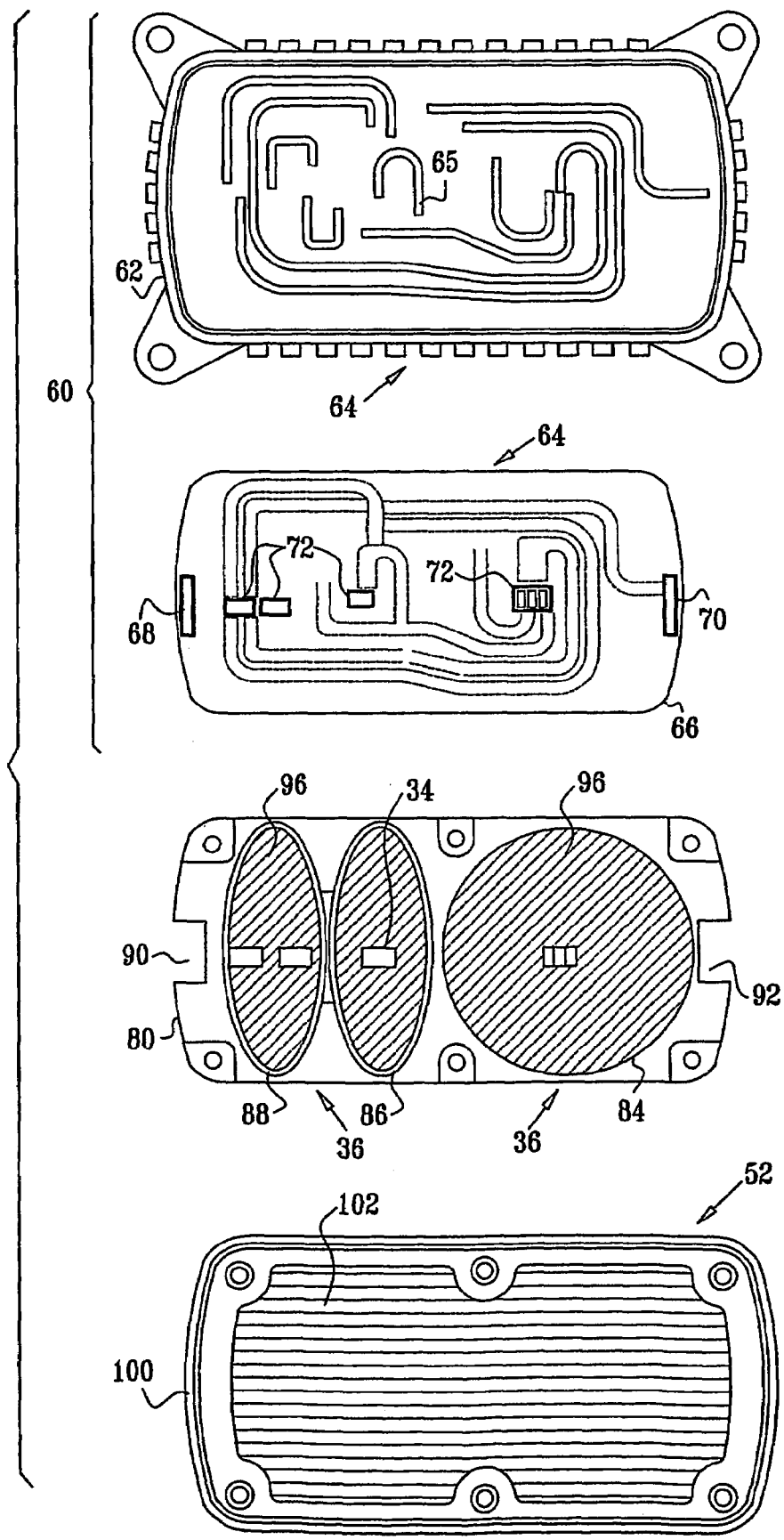

FIGS. 3A, 3B, and 3C are schematic diagrams of antenna assembly 32, according to a preferred embodiment of the present invention. FIG. 3C shows views of four sections of the assembly; FIG. 3A shows a top view of the four sections when assembled; and FIG. 3B is a partial cross-section taken through FIG. 3A. Assembly 32 comprises a waveguide manifold 60 which is formed from two mating sections—a rear manifold and chassis 62, herein also termed rear section 62, and a forward manifold and feeds section 66, herein also termed forward section 66. The sections are most preferably formed from metal so that they are able to act as a heat sink for RF module 38, as described in more detail below. Manifold 60 comprises eight waveguides 64, which are formed by screwing sections 62 and 66 together. (For clarity, screw-hole locations in the sections are not shown in the figures.) One of waveguides 64 conveys the transmitted mm waves from RF module 38 to transmitting feed 34 in a reflector 86. The remaining seven waveguides 64 convey reflected mm waves from respective receiving antenna feeds 36 in reflectors 84 and 88 to RF module 38. Reflectors 84, 86, and 88, are described in more detail below. The transmitted and reflected waves pass through the front of the manifold via horn antennas 68, 70, and apertures 72, of their respective waveguides 64.

Manifold 60 is coupled to an antenna aperture assembly 80, most preferably formed as a single metallic block. Assembly 80 comprises circular reflector aperture 84 having a generally spherical or paraboloidal shape, a first oval reflector aperture 86, and a second oval reflector aperture 88, the oval reflectors having generally paraboloidal shapes. Assembly 80 further comprises two mm wave horn antenna openings 90, 92. Alternatively, assembly 80 may be formed from a number of subassemblies coupled together.

Three receiving antenna feeds 36 in reflector 84 couple to three of waveguides 64. Two antenna feeds 36 in reflector 88 couple to two of waveguides 64. Horn antennas 90 and 92 couple to a further two of waveguides 64. Feeds 36 are distributed within their reflectors, along a generally horizontal symmetry line of the reflectors, and horns 68 and 70 are distributed and angled with respect to the symmetry line, so as to form a receiving radiation pattern comprising a central lobe and a number of side lobes. Feeds 36 and horns 68 and 70 are configured to transmit horizontally polarized mm waves. The receiving radiation pattern is described in more detail with respect to FIG. 4 below.

Transmitting antenna feed 34 couples an end 65 of one of waveguides 64. Feed 34 is located substantially centrally in reflector 86, so that the transmission radiation pattern formed by radiation from the feed is generally similar to the receiving radiation pattern, and is also described in more detail with reference to FIG. 4. Feed 34, as for feeds 36, is configured to transmit horizontally polarized mm waves.

Reflector apertures 84, 86, and 88 have pluralities of linear parallel corrugations 96 formed in their respective surfaces, the corrugations being aligned at approximately 45° to the horizontal. The spacing and depth of corrugations 96 is set so that the reflectors effectively act to rotate horizontally polarized mm waves impinging upon the reflectors to vertically polarized waves, and vice versa. The dimensions of the reflector apertures and their corrugations, are most preferably configured with accuracies of the order of 0.01 mm or better, so that the reflectors are able to operate as efficient reflectors and polarization rotators of mm waves.

Components of manifold 60 and assembly 80 are preferably produced from a metallic alloy such as a magnesium alloy, so that these elements may act both good thermal conductors and as efficient heat sinks for heat produced by RF module 38. Most preferably, manifold 60 and/or assembly 80 are formed from thixo-molded magnesium, which is able to be formed to the accuracies described above by relatively simple techniques known in the art. Thixo-molded magnesium elements may be formed without using high temperatures, so that the required accuracies may be achieved consistently, and so that the final molded elements require substantially no further machining. Components produced from thixo-molded magnesium are most preferably coated, by methods known in the art, to make the components corrosion resistant. Alternatively, manifold 60 and/or assembly 80 may be formed from substantially any other material or sets of materials that enables the radiation patterns illustrated by FIG. 4 to be generated, and so that the heat and mechanical properties described above are met A radome 100 is coupled to assembly 80, to protect the assembly and other portions of unit 30. Radome 100 is formed of generally rigid material that is substantially transparent to mm waves, such as fiberglass. Horizontal conducting lines 102, preferably nickel-copper lines which have a corrosion resistant coating, are plated onto an inside surface of radome 100. The spacing, thickness, and resistance of conducting lines 102 are configured so that radome 100 is able to act both as a polarizer and as a heater. Conducting lines 102 enable radome 100 to transmit vertically polarized mm waves, and reflect horizontally polarized mm waves. In addition, the lines are configured to be connected to a power source, preferably power supply 50, or alternatively any other power source such as a battery of the host vehicle, so that the lines are able to act as heating elements for radome 100. Most preferably, radome 100 comprises a temperature sensor 52 which communicates with DSP 46 (FIG. 2) so that the CPU is able to activate lines 102 to act as heating elements.

The combination of radome 100 with assembly 80 acts as both a folded transmitter antenna assembly and as a folded receiver assembly. Thus, horizontally polarized mm waves from feed 34 are reflected back by radome 100 to reflectors 84, 86, and 88 of assembly 80. The reflectors rotate and reflect the waves to a vertical polarization, and radome 100 transmits the vertically polarized mm waves so that they act as illuminators for objects in front of assembly 32. Similarly, vertically polarized waves reflected from the objects are transmitted by radome 100 to reflectors 84, 86, and 88. The reflectors rotate and reflect the waves to radome 100, which reflects the now horizontally polarized waves back to feeds 36.

The configuration of radome 100 with assembly 80 has a number of advantages. The antenna depth is reduced to half of the focal length, and the feed positions occur naturally behind the antenna (in contrast to the feed position for a parabolic reflector, which occurs in front of the antenna). Manifold 60 is thus able to couple directly and simply to assembly 80, and RF module 38 in turn may be coupled directly and simply to the manifold.

FIG. 4 illustrates schematic transmit and receive azimuthal angular-gain radiation distribution patterns for antenna assembly 32, according to a preferred embodiment of the present invention. An angular-gain receive radiation pattern 112 comprises a central lobe 120, a left and a right lobe 122, 124, a left-left and a right-right lobe 126, 128, and a guard-left and a guard-right lobe 130, 132. Lobes 120, 122, 124, 126, 128, 130, and 132 correspond respectively to the receive radiation patterns of feeds 36C, 36L, 36R, 36LL, 36RR, and horns 68 and 70. Lobes 120, 122, and 124 preferably have widths of approximately 4° in both azimuth and elevation. Lobes 122 and 124 are at approximately ±4.5°, in azimuth to the center line 108. Lobes 126 and 128 preferably have widths of approximately 12°, at approximately ±12° to the center line. Lobes 130 and 132 preferably have widths of approximately 46°, at approximately ±24° to the center line.

A transmit angular-gain radiation distribution pattern 110 is configured to be generally similar to receive radiation pattern 112. Pattern 110 comprises a broad central lobe with two side-lobes 116 and 118. The combination of patterns 110 and 112 corresponds to pattern 24 (FIG. 1). Transmit and radiation patterns 110 and 112 enable unit 30 to detect objects in an approximate range to at least 150 m in front of the host vehicle. More details of objects detected are described below.

Figure 5:
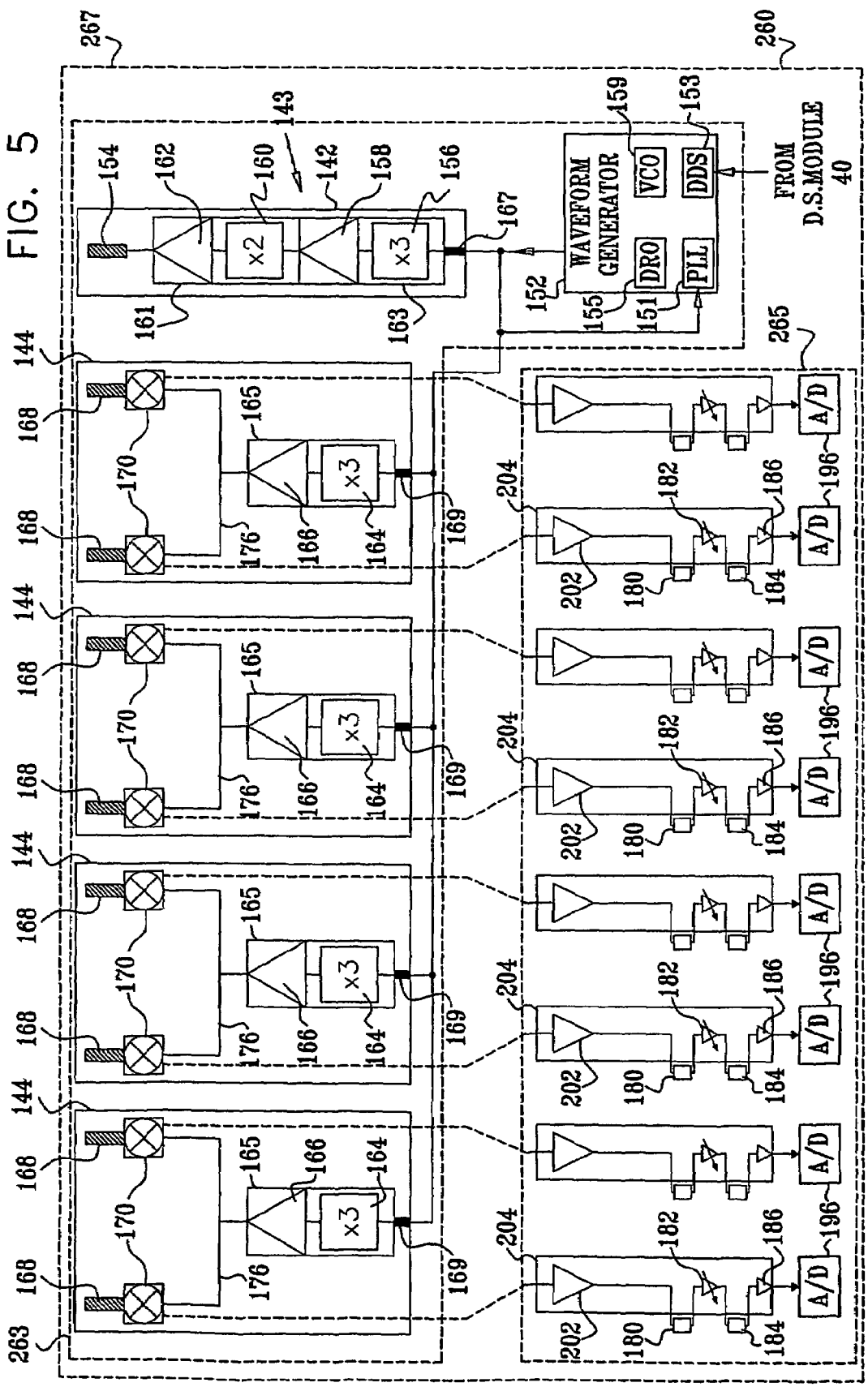
FIG. 5 is a schematic block diagram of a radio-frequency (RF) module, according to a preferred embodiment of the present invention.

FIG. 5 is a schematic block diagram of RF module 38, according to a preferred embodiment of the present invention. A module substantially similar to module 38 is described in detail in PCT application 03/00313 which is assigned to the assignee of the present application RF Module 38 is preferably configured on a printed circuit board (PCB) 260, which is mounted on, and thermally coupled to, the back side of manifold 60 (FIG. 3), so that heat generated by components of module 38 may be efficiently dissipated by the manifold which thus acts as a heat sink for the components. Alternatively, RF module 38 is configured as two or more PCBs, at least one of which is mounted on and thermally coupled to the back side of manifold 60 for the reasons described above, the two or more PCBs being arranged in a stacked formation and connected by mating connectors within unit 30. Except where stated otherwise, the following description assumes that module 38 is configured on PCB 260.

A transmitter module 142 which generates mm waves is mounted on PCB 260. The mm waves from module 142 are coupled to an inlet 65 of a respective waveguide 64 via a mm wave microstrip-waveguide transition 154, which acts as a mm wave output port of the transmitter module. In order to generate its mm waves, transmitter 142 receives a low frequency (LF) reference signal, at frequencies of the order of 12 GHz, from a waveform generator 152. The LF signal is received from a microstrip 261 via a microstrip-microstrip transition 167, which acts as an LF inlet port to transmitter module 142. Waveform generator 152 comprises a phase locked loop (PLL) 151, a direct digital synthesizer (DDS) 153, a dielectric resonator oscillator (DRO) 155, and a voltage controlled oscillator (VCO) 159. PLL 151 serves to stabilize frequencies output from generator 152, and provides a reference level to VCO 159. DRO 155 generates a reference frequency which is mixed with an output from VCO 159, and the mixed output is used as an input to PLL 151. DSS 153 enables a variety of modulations, described in more detail below, to be applied to the frequencies output from generator 152. DDS 153 receives signals controlling the frequencies and modulations generated from DSP module 40, and also generates a reference 30 MHz clock for module 40.

Transmitter module 142 comprises a ×3 frequency multiplier 156, a first amplifier 158, a ×2 frequency multiplier 160, and a second amplifier 162, connected in series. Components 156 and 158 are incorporated into a first integrated circuit (IC) component 157. Components 160 and 162 are incorporated into a second IC component 161. IC components 157 and 161 are in turn mounted on a dielectric substrate 143, forming the base of a chip-scale package. Transmitter 142 is preferably implemented using microwave integrated circuit (MIC) technology. It will be understood that while RF module 38 comprises one transmitter module 142, other RF modules having more than one transmitter module, generally similar to transmitter module 142, may be implemented in unit 30. All such RF modules are assumed to be comprised within the scope of the present invention.

RF module 38 comprises four generally similar mm wave homodyne receiver modules 144, each of which is constructed to receive two mm wave signals, or channels, from respective inlets of waveguides 64 (one of the inlets is a spare, so that seven inlets are used). Each receiver module 144 thus comprises two sub-receivers. It will be appreciated that the plurality of mm wave receiver modules in module 38 may comprise substantially any number of receiver modules, and that each such receiver module may have any suitable number of sub-receivers and corresponding input ports, as long as the number of utilized sub-receivers corresponds with the number of inlets of waveguides 64.

Each receiver module 144 comprises a ×3 frequency multiplier 164 and an amplifier 166. Preferably, multiplier 164 and/or amplifier 166 are substantially similar in physical dimensions to multiplier 156 and amplifier 158, and are advantageously implemented as a single IC 165. Each multiplier 164 receives the LF signal from synthesizer 152 via a microstrip-microstrip transition 169, which acts as an LF inlet port to the respective receiver module 144, and which is implemented in substantially the same manner as microstrip-microstrip transition 167. In each receiver module 144 an amplified output from amplifier 166, having a fundamental frequency, is fed to substantially similar mixers 170, preferably formed as an IC component, via a coupling line 176 which supplies two mixers. Each mixer 170 is also coupled to receive mm wave signals via a mm wave microstrip-waveguide transition 168, which acts as a mm wave input port, and which is implemented in substantially the same manner as microstrip-waveguide transition 154. Each transition 168 is aligned and coupled to a respective waveguide 64 inlet.

Each mixer 170 mixes its mm wave input with a harmonic, preferably a second harmonic, of the fundamental frequency of amplifier 166 so generating a baseband signal. Thus mixer 170 acts both as a mixer and as a harmonic generator, generating a local oscillator (LO) mm wave frequency used by the mixer internally within the mixer. Because the fundamental frequency is a sub-harmonic of the LO mm wave frequency, unwanted radiation out of each transition 168 is virtually eliminated Most preferably, coupling line 176 is configured to act as a low-pass filter, passing the fundamental frequency but stopping passage of the second harmonic mm wave frequency, so that there is very high cross-talk isolation of at least 30 dB between adjacent mixers.

Mixers 170 thus operate as homodyne mixers, generating substantially down-converted base-band frequencies. Each mixer 170 is coupled to a respective base-band receiver block 204, comprising a base-band amplifier 202, most preferably a low noise amplifier. Each amplified base-band signal is transferred via filters 180 and 184, and amplifiers 182 and 186, to respective 12-bit analog-to-digital converters (A/D) 196, which provides a digital signal corresponding to the received signal at a respective mm wave input port 168. Each amplifier 182 most preferably has an adjustable gain, the amplifier receiving a gain adjusting signal from digital signal module 40, so as to maintain an input signal level to the respective A/D 196.

1/f noise generated in mixers 170 may be relatively high compared to 1/f noise generated in mixers operating as heterodyne mixers, since the mixer output is effectively at baseband frequencies in the homodyne mode. To overcome this, the power output from transmitter module 142 may be increased compared to that needed for a transceiver using heterodyne mixers, so as to, overcome the increased 1/f noise. Other methods for compensating for the 1/f noise are also known in the art.

Modules 144, as well as receiver blocks 204, synthesizer 152, and A/D converters 196 are mounted on PCB 260. PCB 260 is configured to have a respective waveguide aperture corresponding to each microstrip-waveguide transition 154 and 168, which in turn mate with waveguides 64. A more detailed representation of one such waveguide aperture is described in PCT application 03/00313. In order to reduce RF leakage from elements of RF module 38, at least some of the elements, such as modules 142 and 144 and VCO 159 are housed in suitable RF shields.

It will be understood that elements in a region 263 of PCB 260 generate high frequencies, whereas elements in a region 265 generate low frequencies. Elements in region 263 are preferentially housed so that their RF frequencies are shielded from the environment. An example of such a shielded system is described below with reference to FIG. 6.

Figure 6:
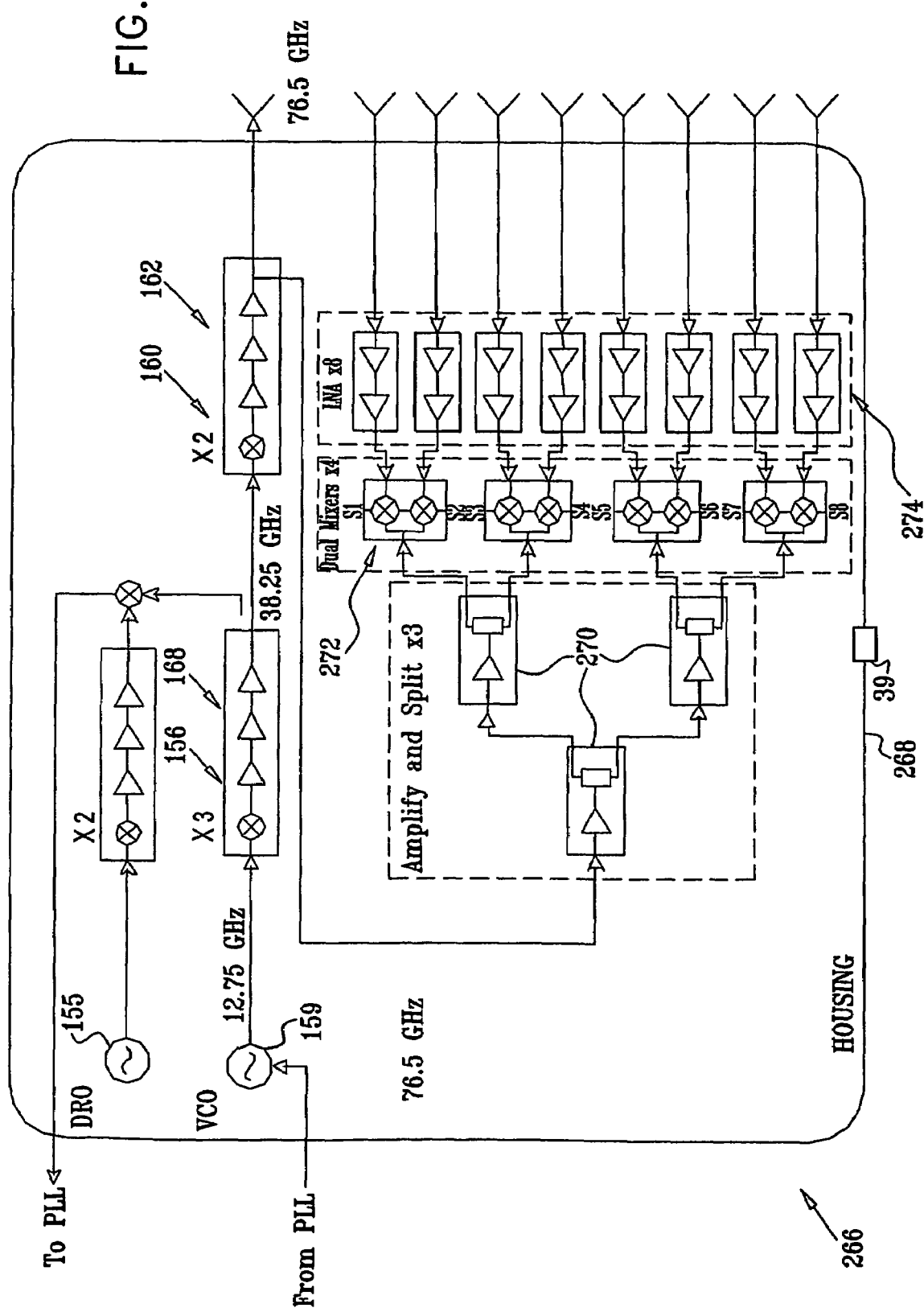
FIG. 6 is a schematic block diagram of an integrated single RF module, according to an alternative preferred embodiment of the present invention.

FIG. 6 is a schematic block diagram of an integrated single module RF front end 266, according to an alternative preferred embodiment of the present invention. Module 266 is an alternative method for configuring elements comprised in RF module 38, so that apart from the differences described below, the operation of front end 266 is generally similar to that of corresponding elements in RF module 38 (FIG. 5), such that elements indicated by the same reference numerals in both figures are generally identical in operation. Elements of RF front end 266 are housed in a conductive RF housing 268, which serves as a mount and a heat sink for the elements, and which may advantageously be coupled directly to rear manifold section 62.

VCO 159, via ×3 frequency multiplier 156, first amplifier 158, ×2 frequency multiplier 160, and second amplifier 162, generates a transmit frequency nominally equal to 76.5 GHz. A portion of the output of amplifier 158 is mixed with a frequency doubled output of DRO 155, and the mixed output is used as a feedback signal to PLL 151, external to housing 268. RF front end 266 comprises three amplify and split modules 270 which amplify a portion of the output of amplifier 162, for use in four dual mixers 272. Each mixer 272 receives an input from apertures 68, 70, and 72 from respective waveguides of rear manifold section 62, via low noise input amplifiers 274. Mixers 272 act as homodyne mixers, generating baseband outputs S1, . . . ,S8, generally as described above for mixers 170. Outputs S1, . . . , S8 are amplified, sampled and digitized, by elements which are positioned outside housing 268, substantially as described above for A/Ds 196. The elements outside housing 268 are preferably located on a PCB to which housing 268 is also coupled. Housing 268 comprises a low frequency (LF) connector 39 which transfers LF signals such as outputs of mixers 272 and DC signals, but which prevents transfer of RF signals. Thus, housing 268 prevents mm wave signals from exiting or entering the housing, except by mm wave feeds coupled to amplifiers 274 and 162.

Figure 7:
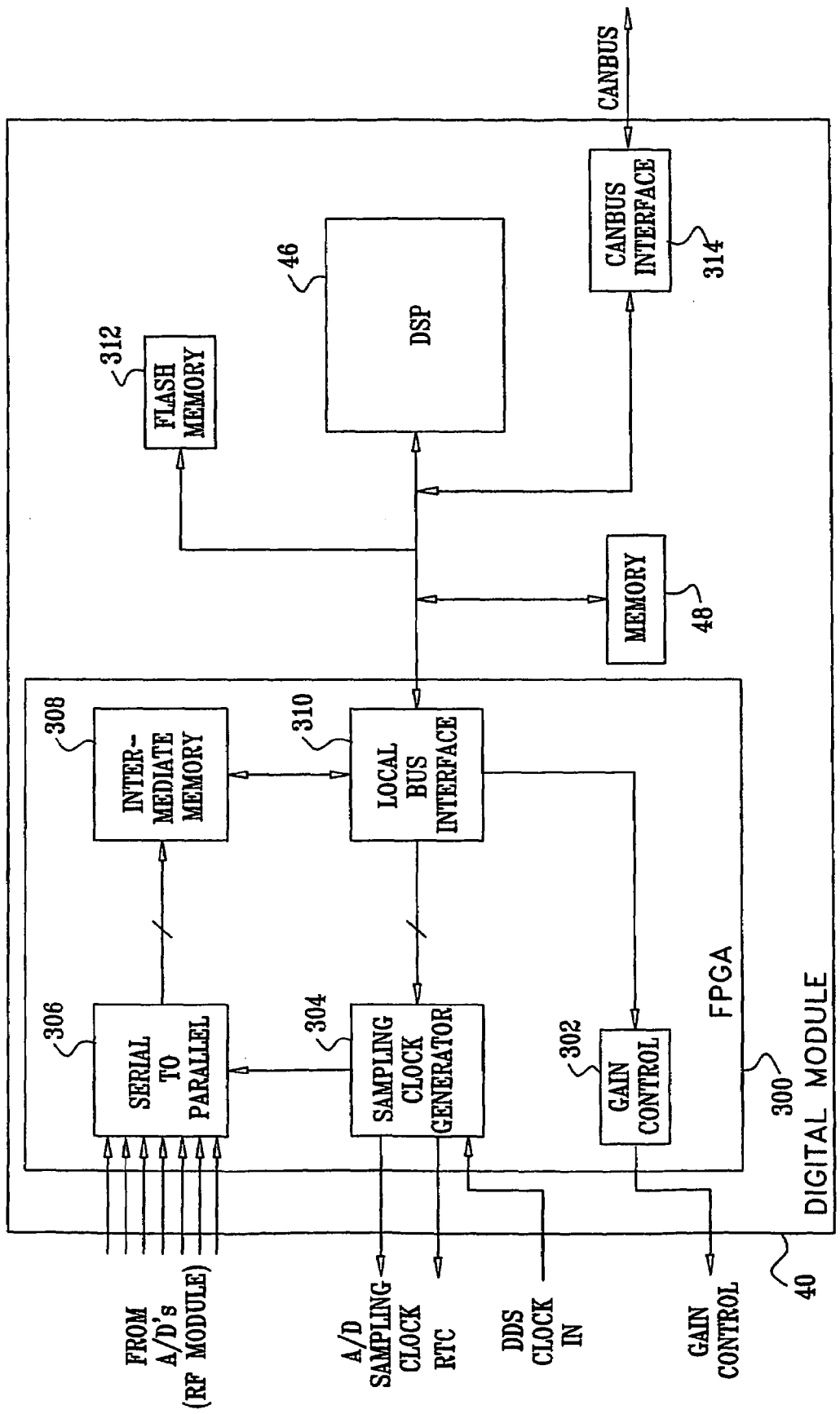
FIG. 7 is a schematic block diagram of a digital signal module, according to a preferred embodiment of the present invention.

FIG. 7 is a schematic block diagram of digital signal module 40, according to a preferred embodiment of the present invention. Module 40 comprises a field programmable gate array (FPGA) 300, preferably an XCSS100-5PQ208I manufactured by Xilinx Corporation, and DSP 46, most preferably a TM320c62111BGFNA, produced by Texas Instruments Corporation. In addition to performing signal processing, DSP 46 acts as a general central processing unit for FLR unit 30. FPGA 300 receives data serially from A/Ds 196 (FIG. 4), and converts the serial data in a Serdes 306 to a parallel form. Alternatively, FPGA 300 receives data from A/Ds 196 in any other suitable form. FPGA 300 stores the data in an intermediate memory 308 which acts as a first-in-first-out (FIFO) memory. FPGA 300 comprises a sampling clock generator 304 which receives an approximately 30 MHz clock from DDS 153, and which uses this as a reference to generate a sampling clock for A/Ds 196, a real time clock (RTC) of period approximately 50 ms which is used by generator 152 to initiate RF transmissions from the generator, and a sampling window time for Serdes 306. FPGA communicates via a local bus interface 310 and a local bus with DSP 46, and transfers via a gain control interface 302 values for the gain of baseband amplifiers 182, the values having been determined in DSP 46.

As is explained in more detail below, unit 30 requires a large amount of computation to be performed in real time. Thus, during each cycle time of 50 ms, DSP 46 may be required to perform in approximately 34 ms 16 Fast Fourier Transforms (FFTs) of 1024 points for each of the seven receive channels. In addition to performing these calculations, DSP 46 also monitors temperature sensors 44, 52, and gyro 42. Temperature sensors 44 are used to monitor temperatures of module 40 and other modules of unit 30; sensor 52 monitors the temperature of radome 100. As necessary, DSP 46 activates lines 102 as heating elements for the radome. DSP 46 also serves to control and perform housekeeping functions for unit 30.

Digital module 40 also comprises a 1 Mb flash memory 312, which is used to store calibration tables for gyro 42 and also for the distribution patterns of the feeds of the antenna assembly. Memory 48, preferably a 4 Mb dynamic random access memory (DRAM), and memory 312 are both used to store software for implementing the algorithms described below.

FIG. 8 is a schematic diagram illustrating two processes for detecting targets used by FLR unit 30, according to a preferred embodiment of the present invention In a Range-Doppler process FLR unit 30 transmits trains of relatively large numbers of short single-slope chirps, typically each train being of the order of 30 chirps of duration 100 μs. The chirps have substantially identical single-slopes. Typically the trains are transmitted with a period of approximately 50 ms. (The Range-Doppler process is described in more detail with respect to FIGS. 9 and 10 below.) Using reflections from the chirps, FLR unit 30 determines the range and range rate of objects within radiation pattern 24. FLR unit 30 is able to effectively plot Range rate vs. range for detected objects, giving results illustrated by diagram 319. Diagram 319 illustrates that echoes from guard rail 28 are received as "clutter" 320 having rates substantially equal to the negative velocity of host vehicle 32. Target 26 appears as a signal 322.

Figure 11:
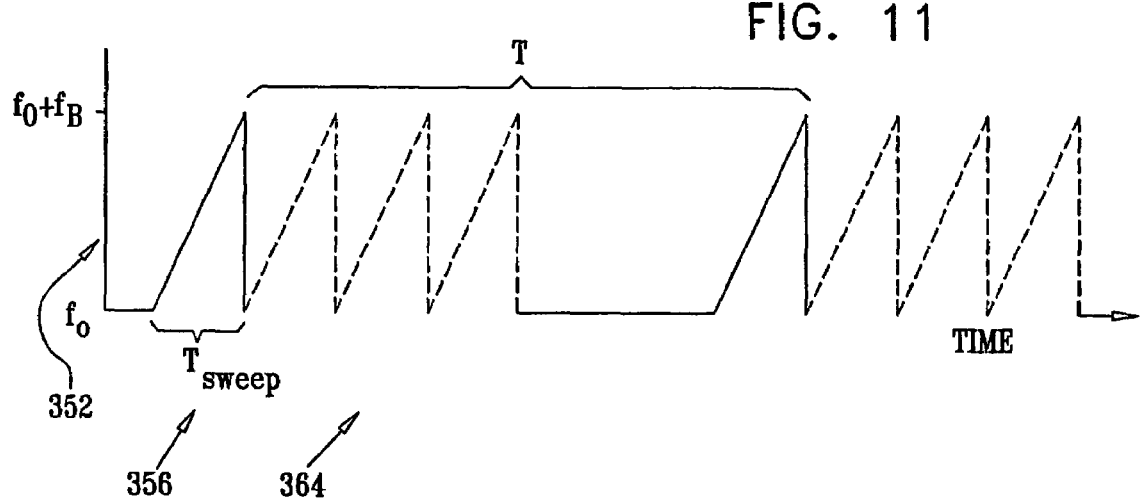
FIG. 11 is a schematic graph illustrating signals transmitted during a first part of a linear frequency modulated continuous wave (LFMCW) process used by the unit of FIG. 1, according to a preferred embodiment of the present invention.

In a linear frequency modulated continuous wave (LFMCW) process, described in more detail with respect to FIG. 11, FLR unit 30 transmits small groups of one or more single-slope chirps, typically 1-4 chirps, each chirp having a duration of approximately 1 ms, the chirps having substantially identical single-slopes. The groups of chirps are repeated approximately every 20-50 ms. FLR 30 is able to effectively plot energy vs. range for detected objects, giving results illustrated by graph 326, where peak 322 corresponds to target 26 and is above a clutter level 324 and a thermal noise level 328.

Figure 9:
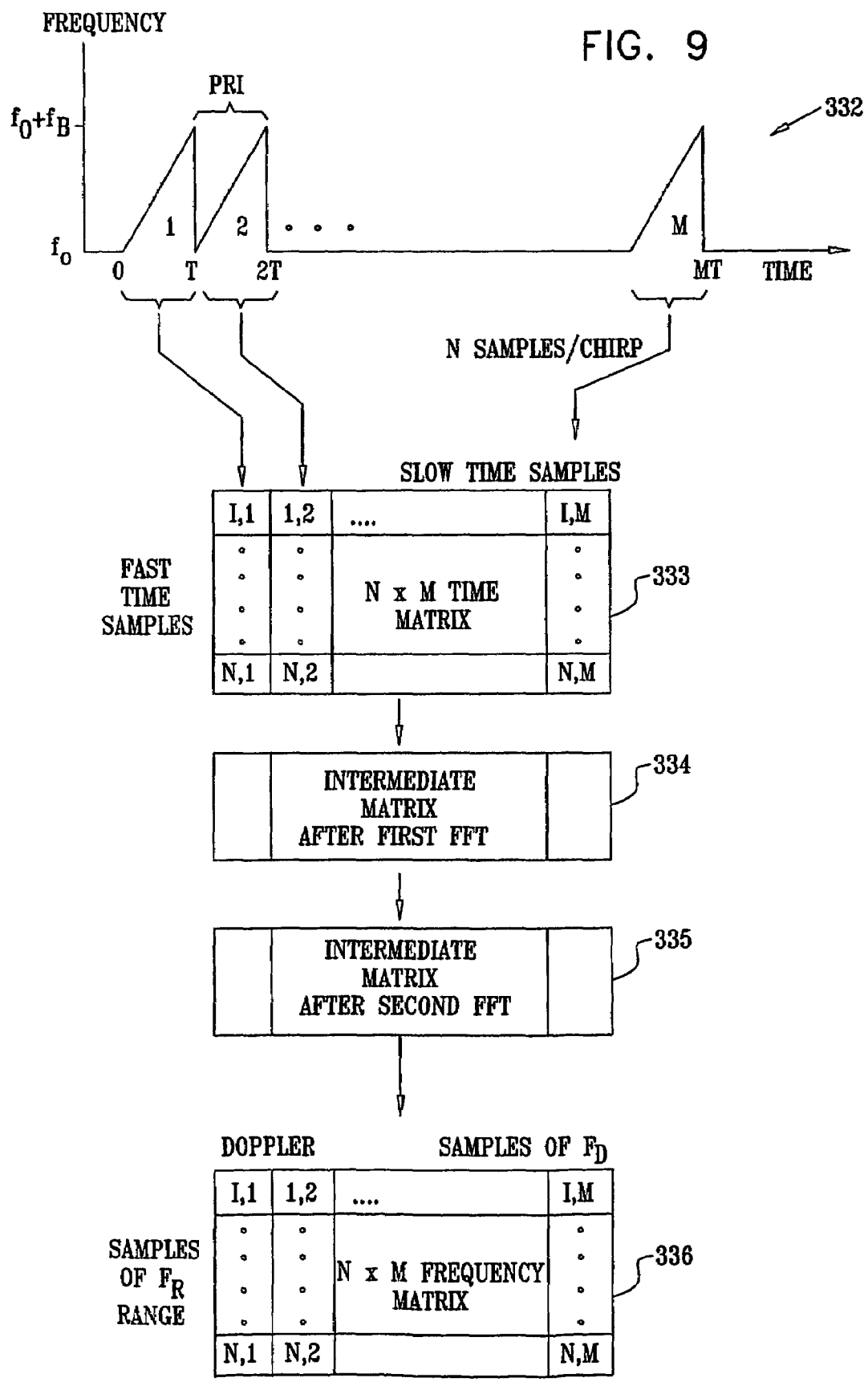
FIG. 9 is a schematic diagram illustrating operations performed in a first part of a Range-Doppler process, according to a preferred embodiment of the present invention.

FIG. 9 is a schematic diagram illustrating operations performed in a first part of the Range-Doppler process, according to a preferred embodiment of the present invention. A graph 332 shows M single-slope chirps, each having a period T, a start frequency $F_0$, and an end frequency $F_0+F_B$, which feed 34 transmits during a cycle time $T_c$. Period T is also termed herein the pulse repetition interval (PRI). Respective feeds 36 for each receive channel receive reflected signals and, as described above with respect to RF module 38, base-band beat frequencies are fed to each A/D 196, which generate N samples during each period T, each sample giving a level of a respective beat frequency. Thus, within cycle time $T_c$, there are MN samples generated per channel of received signals. Typical values for M, N, T, $F_0$, $F_B$, and $T_c$, are 32, 128, 100 μs, 76 GHz, 76.2 GHz, and 3.2 ms respectively, although it will be understood that unit 30 may implement the Range-Doppler process with other suitable values of M, N, T, $F_0$, $F_B$, or $T_c$.

Each set of MN samples may be considered to be arranged in an N rows by M columns matrix 333, the MN samples being in the time domain Each column corresponds to "fast scans" along a single chirp; each row corresponds to "slow scans" between corresponding times of the M chirps. Values of each column of matrix 333 are transformed, in a first FFT operation performed by DSP 46, to replace the fast time values by N frequency samples of a sum $F_R+F_D$, corresponding to equation (1), where $F_R$ represents the range frequency, and $F_D$ is the Doppler frequency. The result of the first FFT is thus equivalent to a matrix 334.

DSP 46 then transforms values in each row of matrix 334 by a second FFT operation that generates M frequency samples of $F_D$ for each row, resulting in a second matrix 335 in the frequency domain The second matrix is corrected to generate values corresponding to a matrix 336, where each row number corresponds to an $F_R$ sample, and each column number corresponds to an $F_D$ sample. Matrix 336 may also be derived by performing the first FFT on the rows of matrix 333, the second $F_D$ on the columns of the resulting matrix, and correcting the second matrix as described above. It will be appreciated that generation of matrix 336 gives direct values for $F_D$, and so of the rate range (velocity) of targets, and that matrix 336 rotated by 90° corresponds to diagram 319 (FIG. 8). Diagram 319 is derived from matrix 336 after adjustments, described in more detail with respect to 10, have been made to the data used to generate the matrix.

The Range-Doppler process implemented by applying chirps of a single period, giving results as shown by graph 319, may generate ambiguous velocity results because of phase aliasing effects in the received signals. For each set of chirps having a specific PRI, there is an ambiguous velocity $\dot{R}_{amb}$, having a value given by:

$$\dot{R}_{amb} = \frac{\lambda}{4 \cdot PRI} \quad (3)$$

where λ is the transmitted wavelength.

Thus, if λ=4 mm and PRI=100 μs, $\dot{R}_{amb}$=10 m/s. In this case a measured range rate of 6 m/s may be generated by targets having true range rates of 6 m/s, 16 m/s, 26 m/s, 36 m/s, . . . , as well as by targets having true range rates of −4 m/s, −14 m/s, . . . .

In general, if the true range rate is outside of the coverage of the ambiguous range rate:

$$\left(\{0 \ \dot{R}_{amb}\} \text{ or } \left\{-\frac{1}{2}\dot{R}_{amb} \frac{1}{2}\dot{R}_{amb}\right\}\right) \quad (4)$$

then the measured range rate $\dot{R}_{meas}$ is given by:

$$\dot{R}_{meas} = \dot{R}_{true} - n \cdot \dot{R}_{amb} \quad (5)$$

where n is an integer that brings $\dot{R}_{meas}$ into the range given by expression (4).

The ambiguity may be resolved by transmitting trains of chirps with different PRIs. Table I below shows values obtained if chirps having PRIs of 100 μs and 83 μs are transmitted.

TABLE I

|  | PRI = 100 μs | PRI = 83 μs |
|---|---|---|
| $\dot{R}_{amb}$ (m/s) | 10 | 12 |
| Measured value | 6 | 4 |
| Possible range rates | 16 | 16 |
| other than | 26 | 28 |
| measured value. | 36 | 40 |
|  | . . . | . . . |
|  | −4 | −7 |
|  | −14 | −19 |

Inspection of Table I shows that while the measured values for the two different chirp rates are 6 m/s and 4 m/s, the only value that coincides among the possible rate range values is 16 m/s.

In a velocity resolution process that may be applied to the Range-Doppler process, FLR unit 30 transmits trains of pulses with different PRIs, preferably three different values of PRI having $\dot{R}_{amb}$ chosen from one of the values of {11.9 m/s, 13 m/s, 14.5 m/s}. Alternatively, unit 30 transmits trains of pulses with a different number of PRIs and/or different values of $\dot{R}_{amb}$, sufficient to overcome ambiguities in measured rate ranges. In some preferred embodiments of the present invention, FLR unit 30 automatically applies a velocity resolution process to the Range-Doppler process when the Range-Doppler process is operative.

Figure 10:
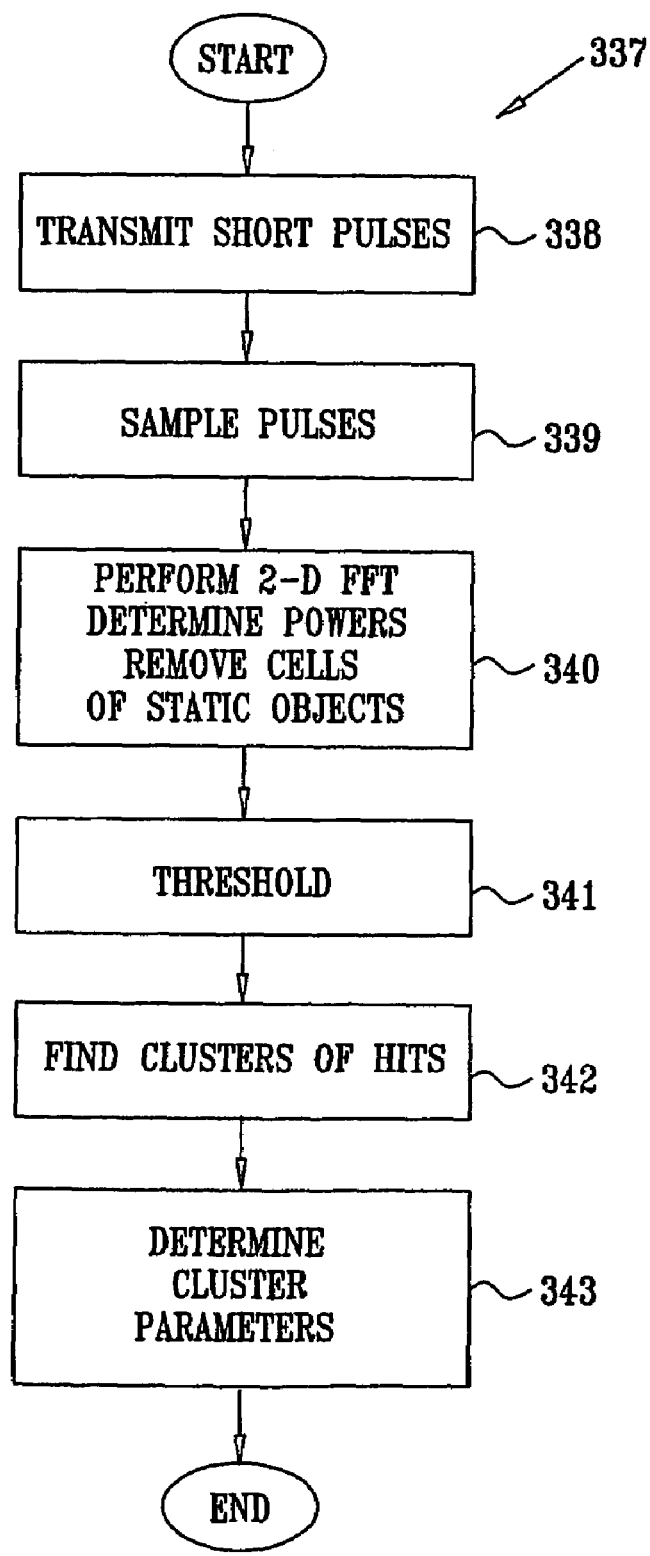
FIG. 10 is a flowchart showing steps performed to implement the first part of the Range-Doppler process and velocity resolution for the process, according to preferred embodiments of the present invention.

FIG. 10 is a flowchart showing steps 337 performed by module 40 to implement the first part of the Range-Doppler process and velocity resolution for the process, according to preferred embodiments of the present invention. In an initial step 338, unit 30 transmits trains of pulses, typically 32 pulses per train, each train having a different PRI between approximately 100 μs and 150 μs, and a bandwidth that is typically chosen from one of the frequencies 40, 80, 100, and 200 MHz. Most preferably the trains cycle between three different PRIs. In a sample step 339, A/Ds 196 (RF module 38) sample the data received for each channel, typically generating 32 samples and transfer the sampled values to DSP module 40.

In a computation step 340, DSP 46 performs a two-dimensional FFT operation, substantially as described above with reference to FIG. 9, on each train and for each sampled channel. Each cell of matrix 336 is then squared to find a value proportional to the powers of the frequencies corresponding to the cells. Module 40 analyzes the results and removes cells of the matrix that generate clutter, corresponding to static objects, most preferably by using the host vehicle speed received from the CAN bus.

In a threshold step 341 DSP 46 analyzes matrix 336 to reduce noise. DSP 46 analyzes along the Doppler axis by testing each cell—the cell-under-test—and finding how its value relates to an average value of cells, typically five, on either side of the cell-under test termed the threshold. If the cell-under-test is a "hit," i.e., has a larger energy than the threshold, module 40 saves parameters (i.e., energy level, range and range rate) of the hit in memory 48.

In an association step 342, module 40 determines hits that are most probably from one target, by examining and merging neighboring hits (in range, range rate, and channel) into a single cluster. The examinations are made within each channel as well as between channels, and hits that are determined to be from one target are formed into respective "clusters."

In a final step 343, module 40 finds a weighted average of the energy of the frequencies for each cluster, to find a best estimate of the range and range rate of the target generating the cluster. Any velocity ambiguities are removed by the velocity resolution process described above. An estimation of the azimuth of the target is made by finding which channels have the highest energy and the next highest energies. Module 40 uses the energy values as entries for a look-up table, which has been generated by calibrating unit 30, so as to determine the azimuth of the target. The target parameters are then stored in memory 48 for future cycles of the Range-Doppler process as the process repeats, and for use in operations performed in a multiple object tracking block 412 (described with reference to FIG. 13) which comprises a second part of the Range-Doppler process.

The Range-Doppler process described above gives good discrimination of targets with different range rates, and is particularly useful for tracking distant targets, where accurate range resolution may not be essential, but where separation from static objects such as guard rails is important.

Figure 12:
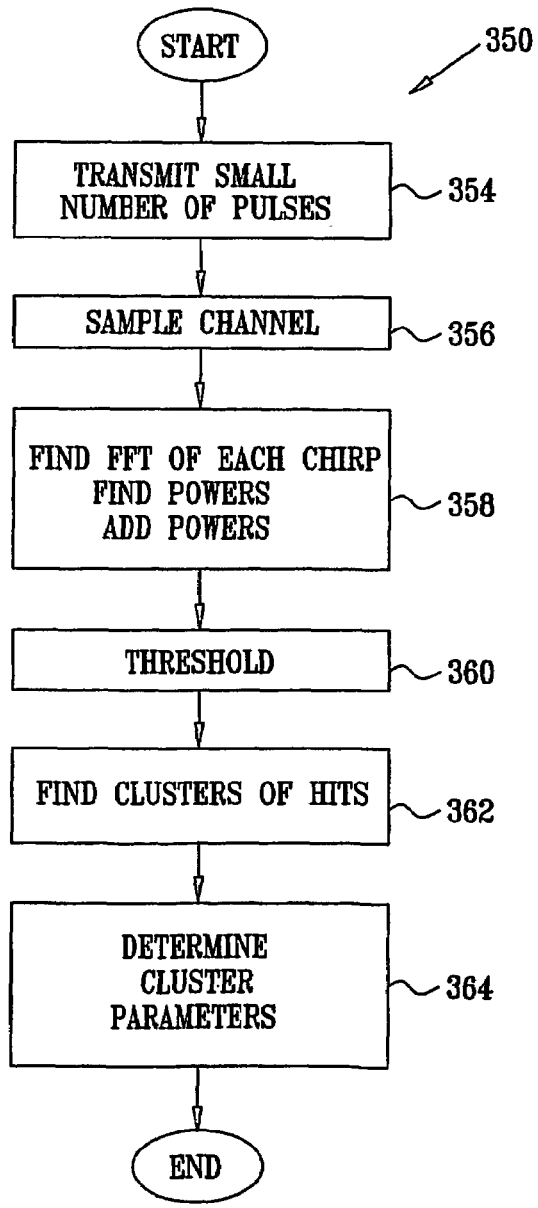
FIG. 12 is a flowchart showing steps of the first part of the LFMCW process, according to preferred embodiments of the present invention.

FIG. 11 is a schematic graph 352 illustrating signals transmitted during a first part of the LFMCW process used by unit 30, and FIG. 12 is a flowchart showing steps 350 of the first part of the process, according to preferred embodiments of the present invention. In an initial step 354 of the LFMCW process, feed 34 transmits a small number N of positive single-slope chirps 356 having period $T_{sweep}$, $F_0$, and $F_B$, typically approximately equal to 1 ms, 76 GHz, and 76.2 GHz. Numbers of chirps N transmitted is typically in a range from 1-4

In a second step 356, the reflected signals for each receive channel are received by respective feeds 36 and base-band beat frequencies are fed to each A/D 196, as described above with respect to FIG. 5. The A/Ds typically take 1024 samples for each chirp.

In a third step 358, an FFT is performed on each of the chirps, to initially generate 1024 values. Since these values are symmetric about a center frequency only the first 512 values are used, and the remainder are discarded. Each of the 512 values are squared to estimate the energy at that frequency. Respective squares of each chirp are added so as to integrate over the N chirps, thus reducing the signal-to-noise.

The first part of the LFMCW process continues with steps 360, 362, and 364, which are substantially similar to steps 341, 342, and 343 (except that there is no velocity ambiguity resolution) described above with respect to FIG. 10, and process 350 ends at step 364. The target parameters from step 364 are stored in memory 48 for future cycles of the LFMCW process as the process repeats, and for use in operations performed in a multiple object tracking block 412 which comprises a second part of the LFMCW process.

The LFMCW process described above is particularly useful when there are short distances to targets, since the process may be implemented with very high range resolution.

Figure 13:
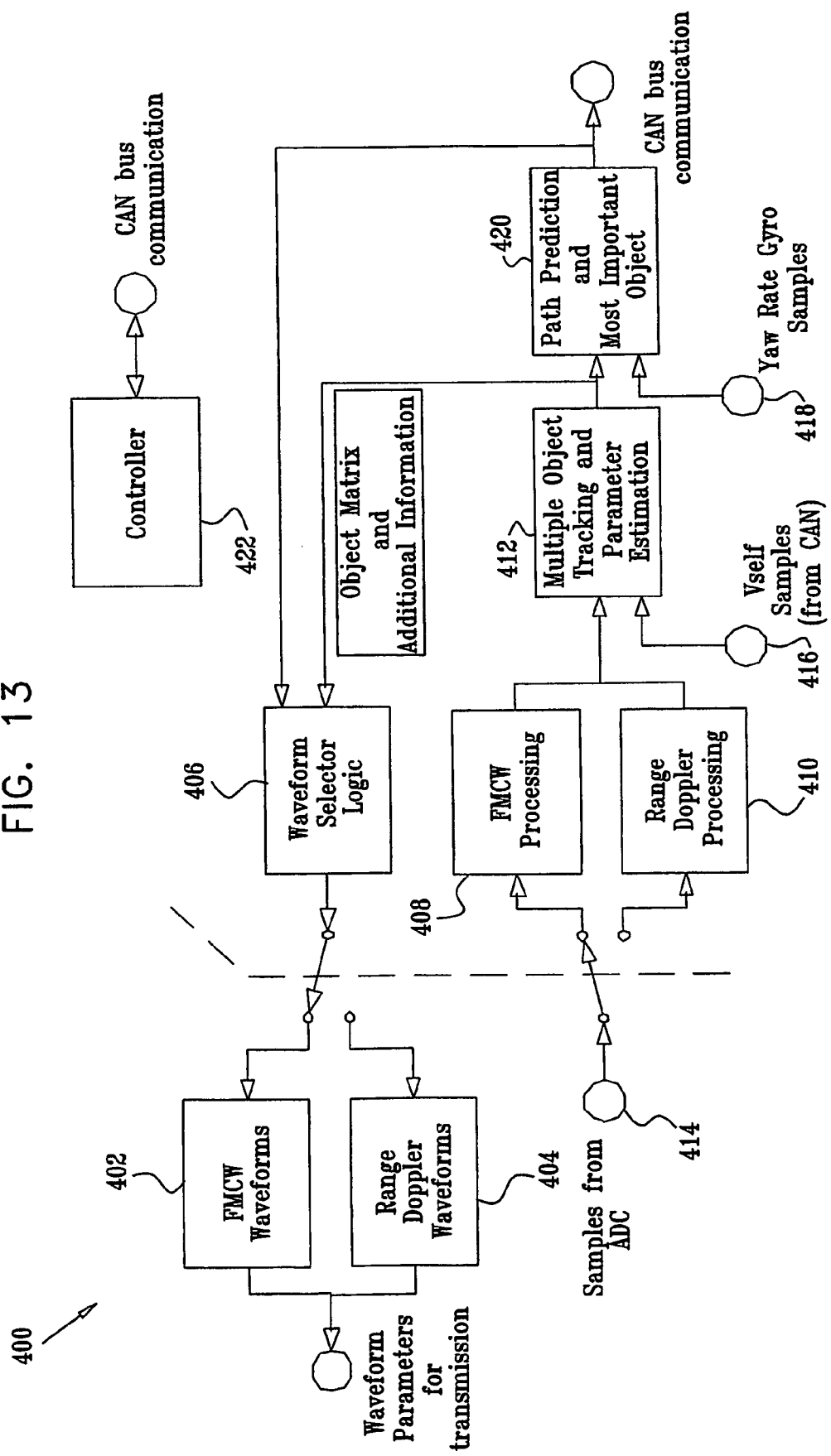
FIG. 13 is a schematic block diagram illustrating functions performed by the unit of FIG. 1, according to a preferred embodiment of the present invention.

FIG. 13 is a schematic block diagram illustrating functions 400 performed by FLR 30, according to a preferred embodiment of the present invention. As described above, FLR unit 30 is able to generate LFMCW or Range Doppler waveforms in waveform generator 152. The parameters for the different waveforms, e.g., their bandwidth, period, and/or PRI, are generated by DSP 46, as illustrated by blocks 402 and 404, preferably according to information derived from a state machine comprised in a waveform selector logic block 406. The state machine is described in more detail with respect to FIG. 14.

Sampled data from A/Ds 196 is processed according to LFMCW processing block 408 and Range Doppler processing block 410, depending which type of waveform (402 or 404) is being transmitted. Operations represented by blocks 408 and 410 are respectively described above with reference to FIGS. 9 and 10 (first part of Range-Doppler) and FIGS. 11 and 12 (first part of LFMCW). Data from each of these processes is used to track multiple objects and provide estimates of relevant parameters of these objects to block 412.

Operations in multiple object tracking block 412 correspond to a common second part of the Range-Doppler and LFMCW processes. In block 412 digital module 40 maintains track files, typically up to approximately 20 files, each file corresponding to an identified target. Each track file comprises filtered and predicted range and range rate for its specific target. As each set of new measurements of ranges and range rates is received from block 408 or 410, in the form of clusters, the new clusters are correlated with existing track files to identify existing targets, i.e., the correlation is successful. Operations performed in 412 also use values 416 of the range rate of host vehicle 22, to be used in the correlations. The existing target files for successful correlations are updated according to which processing—FMCW processing 408 or Range Doppler processing 410—has been used for the new measurements.

If FMCW processing has been used, module 40 determines a difference between the measured beat frequency $$\langle f_{beat}^+(nT) \rangle$$

and a predicted beat frequency (derived from a predicted range, $R_n^{pred}$, and a predicted range rate, $\dot{R}_n^{pred}$, as described below). In block 412 module 40 uses the difference to update the rate and range rate of the target. A more detailed description of a method for deriving the rate and range rate, when LFMCW is used, after each cycle, is given below. Those skilled in the art will be able to adapt the description to the Range-Doppler process.

(If Range-Doppler processing has been used, two differences are calculated—a first difference between measured and predicted ranges, and a second difference between measured and predicted range rates. Both differences are used to update the range and range rates. Updating in both types of processing is preferably filtered, typically by applying constant gains to the updated values, to smooth variations in the updated values. Alternatively, other types of filtering, such as applying filters with variable gains, may be used when updating the range and range rates.)

For the LFMCW process, after each cycle, i.e., at times $t_n = nT$ where n is a positive integer, DSP 46 analyzes the data within each track file to determine the range and range rate (the velocity) of the target, most preferably by numerically solving equation (6).

$$\langle f_{beat}^+(nT) \rangle = aR_n + b\dot{R}_n, \quad (6)$$

where $\langle f_{beat}^+(nT) \rangle$ is the average beat frequency;

$R_n$ is the range;

$\dot{R}_n$ is the range rate, for time $t_n = nT$;

and a, b are as defined for equation (1).

(Equation (6) is a differential equation that can be exactly solved to give $$R_n = \frac{f_{beat}^+}{a} + K\exp\left(-\frac{a}{b}Tn\right) \quad (7)$$

where K is a constant

Thus, values of $R_n$ determined by equation (6) will decay to $$R_n = \frac{f_{beat}^+}{a}$$

with a time constant $$\tau = \frac{b}{a}.)$$

Inspection of equation (7) shows that if $f_{beat}^-$ is used instead of $f_{beat}^+$, there is exponential growth. We therefore stress that in generating LFMCW chirps 356 (FIG. 11) it important to use positive single-slope chirps, since using negative single-slope chirps leads to exponential growth rather than decay.

A solution for equation (6) is most preferably obtained using equation (8):

$$\begin{bmatrix} R_n^{est} \\ \dot{R}_n^{est} \end{bmatrix} = \begin{bmatrix} R_n^{pred} \\ \dot{R}_n^{pred} \end{bmatrix} + \begin{bmatrix} K_r \\ K_{rr} \end{bmatrix} \cdot \left(f_n - aR_n^{pred} - b\dot{R}_n^{pred}\right) \quad (8)$$

where a predicted range, $R_n^{pred}$, a predicted range rate, $\dot{R}_n^{pred}$, are defined in terms of an estimated range, $R_n^{est}$, and an estimated range rate, $\dot{R}_n^{est}$, by equation (9):

$$\begin{bmatrix} R_n^{pred} \\ \dot{R}_n^{pred} \end{bmatrix} = \begin{bmatrix} R_{n-1}^{est} + T \cdot \dot{R}_{n-1}^{est} \\ \dot{R}_{n-1}^{est} \end{bmatrix} \quad (9)$$

and where $K_r$ is a range constant and $K_{rr}$ is a range rate constant $K_r$ is typically approximately equal to $$0.24 \frac{m}{kHz}$$

and $K_{rr}$ is typically approximately equal to $$0.72 \frac{m \cdot s^{-1}}{kHz}.$$

Equation (9) corrects the predicted range and range rate by adding a term $$\left(f_n - aR_n^{pred} - b\dot{R}_n^{pred}\right)$$

multiplied by respective gain constants $K_r$ and $K_{rr}$, where $f_n$ is the average beat frequency.

It will be appreciated that equation (9) acts as a filter for $R_n^{est}$ and $\dot{R}_n^{est}$, and that other filters, including higher order filters that may include higher derivatives of the range and/or range rate, and/or variable coefficient filters such as a Kalman filter, may be used to determine the range and the range rate.

We have found that the LFMCW process described above, corresponding to blocks 408 and 412, allows good tracking of all targets, without ghost generation Operations within block 412 also generate new track files. Clusters from blocks 410 and 408 are maintained in memory 48 for approximately 2-5 cycles, i.e., or approximately 250 ms. Module 40 checks for correlations between these new lusters and further clusters incoming from blocks 410 and 408, substantially as describe above for existing clusters. If two clusters from different cycles correlate, then a new track file is opened with parameters for the target derived from the correlation. It will be understood that module 40 is able to use the velocity resolution process described above with reference to equations (3)-(5) for resolving ambiguous velocities for new clusters. Module 40 may use the resolution process to confirm values for existing clusters, although there should be no ambiguity in these clusters since they use predicted values from already existing targets.

Track files for which no new data has been received for a period of time, typically corresponding to 3-10 cycles, are deleted. Module 40 most preferably sets the period of time before deletion according to a "life length" of the target—the life length being a function of parameters such as the range rate of the target.

Block 412 provides data for each of the tracked objects to waveform selector logic, and also to a path prediction and most important object (MIO) block 420.

In block 420 module 40 determines a predicted path of host vehicle 22. The predicted path is calculated using the speed of vehicle 22, preferably derived from the CAN bus of vehicle 22, or alternatively using other speed sensors. The predicted path calculation also uses a yaw rate measurement received from gyro 42. An MIO is most preferably selected as the target closest to the predicted path of host vehicle 22, and data on the MIO are preferably provided to the host vehicle via the CAN bus, and also to waveform selector logic block 406.

A controller block 422 comprises software for operations performed by module 40, including housekeeping operations for the module. Such software includes, but is not limited to, programs for initializing and operating DDS 153, programs to provide automatic gain control (AGC) to amplifiers 182 to ensure A/Ds 196 do not saturate, and communications with the CAN bus of the host vehicle.

Figure 14:
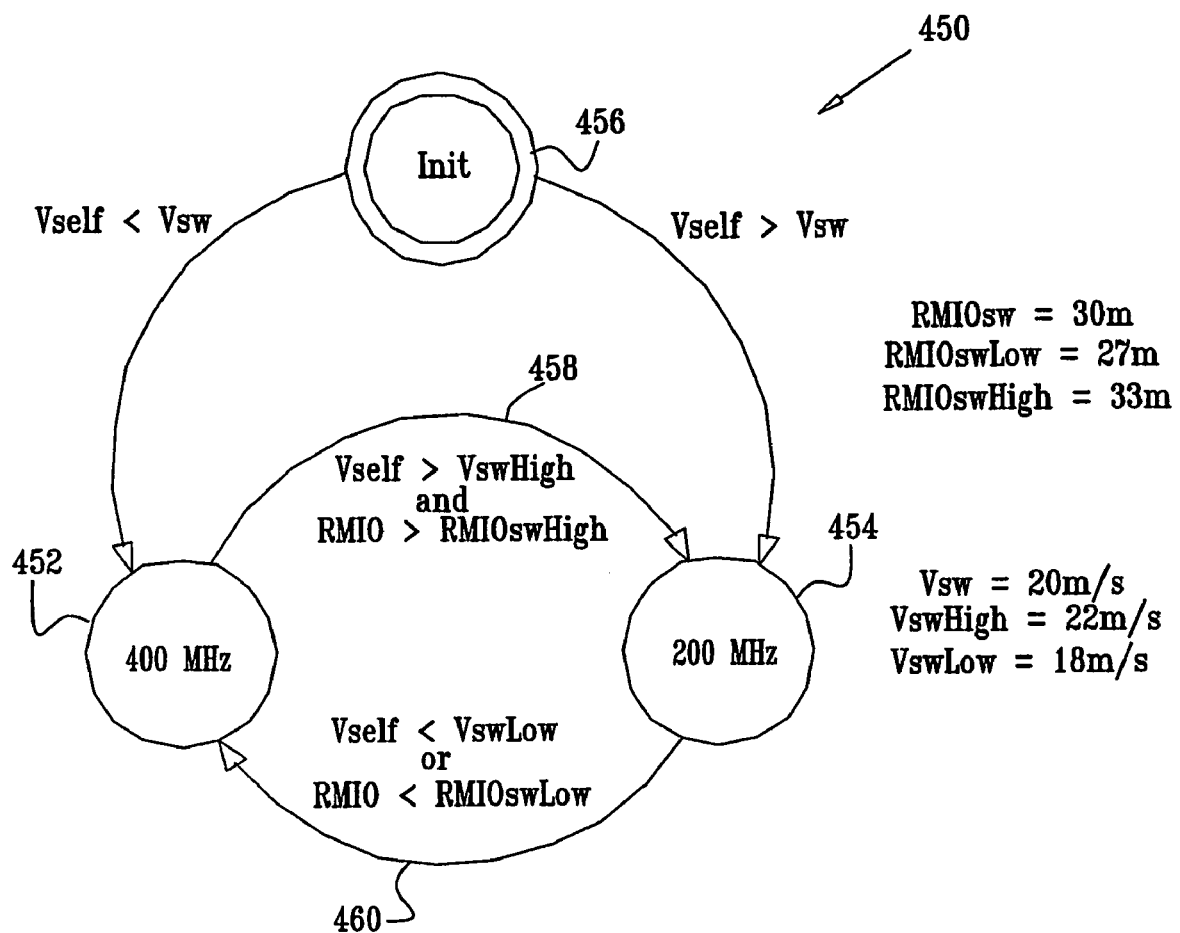
FIG. 14 is a schematic diagram illustrating a state machine that operates in the unit of FIG. 1, according to a preferred embodiment of the present invention.

FIG. 14 is a schematic diagram illustrating a state machine 450 that operates in block 406, according to a preferred embodiment of the present invention. Machine 450 is operated by module 40. At an initialization state 456, parameters which are used to determine in which state machine 450 operates are entered into memory 48. The parameters preferably include ranges of the MIO: $R_{MIOsw}$, $R_{MIOswLow}$, and $R_{MIOswHigh}$, corresponding respectively to a middle, a lower, and an upper value of the range of the MIO. The parameters preferably also include "switch" speed values that are constants which are compared with a speed $v_{self}$ of host vehicle 22. Preferably machine 450 uses 3 switch values: $v_{sw}$, $v_{swLow}$, and $v_{swHigh}$, corresponding respectively to a middle, a lower, and an upper value of the speed of the host vehicle. Typical values for the parameters are:

$R_{MIOsw}$=30 m, $R_{MIOswLow}$=27 m, and $R_{MIOswHigh}$=33 m; $v_{sw}$=20 m/s, $v_{swLow}$=18 m/s, and $v_{swHigh}$=22 m/s.

After initialization, machine 450 moves to one of states 452 or 454. If $v_{self}$<$v_{sw}$, i.e. when the host vehicle is travelling relatively slowly, machine 450 moves to state 452. If $v_{self}$>$v_{sw}$, i.e. when the host vehicle is travelling relatively quickly, machine 450 moves to state 454. State 452 corresponds to an FMCW waveform with a bandwidth of 400 M and a set of Range Doppler waveforms having ambiguous velocities {11.9 m/s, 13 m/s, 14.5 m/s}, and typically corresponds to low values of MIO or low values of $v_{self}$. State 454 corresponds to an FMCW waveform with a bandwidth of 200 MHz and the same Range Doppler waveforms as state 452, and typically corresponds to high values of MIO and high values of $v_{self}$.

As shown in path 458, if $v_{self}$>$v_{swHigh}$ and $R_{MIO}$>$R_{MIOswHigh}$, state machine 450 changes from state 452 to 454. Similarly, as shown in path 460, if $v_{self}$<$v_{swLow}$, or $R_{MIO}$>$R_{MIOswlow}$, the state machine changes from state 454 to state 452.

It will be understood that the parameters for each of states 452 and 454, and conditions for changing between the states, as described above, are given by way of example. Many variations may be made to these parameters and conditions in order to optimize detection and tracking of targets, and such variations will be apparent to those skilled in the art.

Within states 452 and 452, it will be appreciated that there may be many sub-states. For example:

If $v_{self}$>10 m/s, choose Range-Doppler, and if $R_{MIO}$>30 m choose the waveform with a range resolution $\left(\frac{c}{2B}\right)$ of 3.5 m.

If $v_{self}$>10 m/s, choose Range-Doppler, and if 10<$R_{MIO}$<30 m, choose the waveform with a range resolution of 1.75 m.

If $v_{self}$<10 m, then alternatively use Range-Doppler with 0.7 m range resolution and FMCW with 0.35 m range resolution. (This state is advantageously used for "Stop & Go" situations).

Other sub-states for state machine 450 will be apparent to those skilled in the art.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. An assembly for receiving and transmitting millimeter (mm) waves, comprising:
    at least one mm wave reflector;
    at least one mm transmission wave feed configured in a transmission feed location within the at least one mm wave reflector;
    a plurality of receiving mm wave feeds configured in respective receiving feed locations within the at least one mm wave reflector; and
    a radio frequency (RF) module, which is coupled to the at least one mm transmission wave feed and to the plurality of the receiving mm wave feeds, so as to drive the at least one mm transmission wave feed to transmit outgoing mm waves and to simultaneously receive incoming mm waves from all of the plurality of the receiving mm wave feeds,
    wherein the at least one mm transmission wave feed is characterized by a transmission angular-gain distribution pattern dependent upon the transmission feed location, and wherein the receiving mm wave feeds are characterized by respective reception angular-gain distribution patterns dependent upon the respective receiving feed locations, so that the reception angular-gain distribution patterns form an overall reception angular-gain distribution pattern which is substantially similar to the transmission angular-gain distribution pattern.

2. The assembly according to claim 1, and comprising a radome which is adapted to cover the at least one mm wave reflector and to interact with the outgoing mm waves so as to form the transmission angular-gain distribution pattern, and to interact with the incoming waves so as to form the overall transmission angular-gain distribution pattern.

3. The assembly according to claim 1, wherein the at least one mm wave reflector, the at least one mm transmission wave feed, the plurality of receiving mm wave feeds, and the RF module, are adapted to be mounted as a unit on an automotive vehicle.

4. The assembly according to claim 1, wherein the at least one mm wave reflector, the plurality of receiving mm wave feeds, and the RF module are fixed to a housing that is adapted to be fixed to a vehicle, and comprising a gyroscope that is coupled to the housing and that is adapted to measure a yaw rate of the vehicle.

5. A forward-looking radar system, comprising:
    a millimeter (mm) wave transceiver, which is adapted to transmit mm waves toward a target and to receive the mm waves reflected from the target so as to provide signals in response to the reflected waves, the transceiver having a first state in which the transceiver transmits and receives the mm waves in accordance with a Range- Doppler process, and a second state in which the transceiver transmits and receives the mm waves in accordance with a linear frequency modulated continuous wave (LFMCW) process; and a processing module, which is coupled to process the signals so as to determine a position and a velocity of the target, and which is adapted, in response to the position and the velocity, to switch the transceiver between the first state and the second state, and comprising a unit wherein the mm wave transceiver and the processing module are mounted, wherein the unit is adapted to be mounted on an automotive vehicle, and wherein the target comprises an automotive target, wherein the Range-Doppler process comprises:

transmitting a first train of mm wave single-slope chirps from the automotive vehicle, the first train having a first pulse repetition interval (PRI);

receiving first mm reflected waves from the automotive target at the automotive vehicle in response to the first train;

generating first signals in response to the first mm reflected waves;

determining from the first signals a first plurality of possible velocities of the automotive target;

transmitting a second train of mm wave single-slope chirps from the automotive vehicle, the second train having a second PRI different from the first PRI;

receiving second mm reflected waves from the automotive target at the automotive vehicle in response to the second train;

generating second signals in response to the second mm reflected waves;

determining from the second signals a second plurality of possible velocities of the automotive target; and correlating the first and second pluralities of possible velocities to determine a true velocity of the automotive target.

6. A forward-looking radar system, comprising:

a millimeter (mm) wave transceiver, which is adapted to transmit mm waves toward a target and to receive the mm waves reflected from the target so as to provide signals in response to the reflected waves, the transceiver having a first state in which the transceiver transmits and receives the mm waves in accordance with a Range-Doppler process, and a second state in which the transceiver transmits and receives the mm waves in accordance with a linear frequency modulated continuous wave (LFMCW) process; and a processing module, which is coupled to process the signals so as to determine a position and a velocity of the target, and which is adapted, in response to the position and the velocity, to switch the transceiver between the first state and the second state, and comprising a unit wherein the mm wave transceiver and the processing module are mounted, wherein the unit is adapted to be mounted on an automotive vehicle, and wherein the target comprises an automotive target, wherein the Range-Doppler process comprises:

transmitting a train of mm wave single-slop chirps having multiple frequencies from the automotive vehicle;

receiving reflected mm waves from the automotive targets in response to the chirp;

mixing the reflected mm waves with the frequencies of the chirps in order to determine beat frequencies;

performing a plurality of Fast Fourier Transforms (FFT) sequentially on the beat frequencies to determine transformed values; and determining the position and the velocity of the automotive target in response to the transformed values.

7. A forward-looking radar system, comprising:

a millimeter (mm) wave transceiver, which is adapted to transmit mm waves toward a target and to receive the mm waves reflected from the target so as to provide signals in response to the reflected waves, the transceiver having a first state in which the transceiver transmits and receives the mm waves in accordance with a Range-Doppler process, and a second state in which the transceiver transmits and receives the mm waves in accordance with a linear frequency modulated continuous wave (LFMCW) process; and a processing module, which is coupled to process the signals so as to determine a position and a velocity of the target, and which is adapted, in response to the position and the velocity, to switch the transceiver between the first state and the second state, and comprising a unit wherein the mm wave transceiver and the processing module are mounted, wherein the unit is adapted to be mounted on an automotive vehicle, and wherein the target comprises an automotive target, wherein the automotive target comprises a first and a second automotive target, and wherein the LFMCW process comprises:

transmitting toward the automotive targets a sequence of mm wave positive single-slope chirps, each of the chirps comprising multiple frequencies;

receiving reflected mm waves from the automotive targets in response to the chirps;

mixing the reflected mm waves with the frequencies of the chirps in order to determine beat frequencies; and determining a position and a velocity of the first automotive target and a position and a velocity of the second automotive target in response to the beat frequencies.

8. The system according to claim 7, wherein determining the position and velocity of the first and second automotive targets comprises maintaining a track file comprising the positions of the first and second automotive targets and determining the velocities of the first and second automotive targets by evaluating differences of the positions.

9. The system according to claim 8, wherein maintaining the track file comprises evaluating initial positions of the first and second automotive targets after an initial chirp comprised in the sequence of chirps, and evaluating subsequent positions of the first and second automotive targets after a subsequent chirp comprised in the sequence of chirps, and wherein determining the velocities comprises evaluating differences between the subsequent and the initial positions, and comparing the differences to a time between the initial and the subsequent chirp.

10. A method for tracking a first and a second target, comprising:

transmitting toward the targets a sequence of millimeter (mm) wave chirps, each of the chirps comprising multiple frequencies and having substantially identical positive single-slopes;

receiving reflected mm waves from the targets in response to the chirps;

mixing the reflected mm waves with the frequencies of the chirps in order to determine beat frequencies; and determining a position and a velocity of the first target and a position and a velocity of the second target in response to the beat frequencies, wherein transmitting the sequence of mm wave chirps comprises transmitting an initial chirp and a subsequent chirp, and wherein determining the position and the velocity of the first target and of the second target comprises determining an initial position of the first target and an initial position of the second target in response to the initial chirp, and determining a subsequent position of the first target and a subsequent position of the second target in response to the subsequent chirp, and determining the velocity of the first target in response to the initial position and subsequent position of the first target and the velocity of the second target in response to the initial position and subsequent position of the second target.

11. A method for tracking a first and a second target, comprising:
   transmitting toward the targets a sequence of millimeter (mm) wave chirps, each of the chirps comprising multiple frequencies and having substantially identical positive single-slopes;
   receiving reflected mm waves from the targets in response to the chirps;
   mixing the reflected mm waves with the frequencies of the chirps in order to determine beat frequencies; and
   determining a position and a velocity of the first target and a position and a velocity of the second target in response to the beat frequencies,
   wherein determining the position and the velocity of the first target comprises maintaining a track file comprising a previous position and a previous velocity of the first target, and finding a predicted position and a predicted velocity of the first target in response to the previous position and the previous velocity, and comparing the predicted position and the predicted velocity with a resultant position and a resultant velocity of the first target determined from the beat frequencies.

12. A method for receiving and transmitting millimeter (mm) waves, comprising:
   providing at least one mm wave reflector;
   determining a transmission feed location within the at least one mm wave reflector;
   configuring at least one mm transmission wave feed in the transmission feed location;
   determining a plurality of receiving feed locations within the at least one mm wave reflector;
   configuring respective receiving mm wave feeds in the plurality of receiving feed locations; and
   coupling a radio frequency (RF) module to the at least one mm transmission wave feed and to the plurality of the receiving mm wave feeds, so as to drive the at least one mm transmission wave feed to transmit outgoing mm waves and to simultaneously receive incoming mm waves from all of the plurality of the receiving mm wave feeds,
   wherein the at least one mm transmission wave feed is characterized by a transmission angular-gain distribution pattern dependent upon the transmission feed location, and wherein the receiving mm wave feeds are characterized by respective reception angular-gain distribution patterns dependent upon the respective receiving feed locations, so that the reception angular-gain distribution patterns form an overall reception angular-gain distribution pattern which is substantially similar to the transmission angular-gain distribution pattern.

13. The method according to claim 12, and comprising covering the at least one mm wave reflector with a radome which is adapted to interact with the outgoing mm waves so as to form the transmission angular-gain distribution pattern, and to interact with the incoming waves so as to form the overall transmission angular-gain distribution pattern.

14. The method according to claim 12, wherein the at least one mm wave reflector, the at least one mm transmission wave feed, the plurality of receiving mm wave feeds, and the RF module, are adapted to be mounted as a unit on an automotive vehicle.

15. The method according to claim 12, wherein the at least one mm wave reflector, the plurality of receiving mm wave feeds, and the RF module are fixed to a housing that is adapted to be fixed to a vehicle, and comprising coupling a gyroscope that is adapted to measure a yaw rate of the vehicle to the housing.

16. A method for operating a forward-looking radar unit, comprising:
   providing a millimeter (mm) wave transceiver, which is adapted to transmit mm waves toward a target and to receive the mm waves reflected from the target so as to provide signals in response to the reflected waves, the transceiver having a first state in which the transceiver transmits and receives the mm waves in accordance with a Range-Doppler process, and a second state in which the transceiver transmits and receives the mm waves in accordance with a linear frequency modulated continuous wave (LFMCW) process; and
   coupling a processing module to the transceiver to process the signals so as to determine a position and a velocity of the target, the processing module being adapted, in response to the position and the velocity, to switch the transceiver between the first state and the second state,
   and comprising mounting the mm wave transceiver and the processing module within a unit that is adapted to be mounted on an automotive vehicle, and wherein the target comprises an automotive target,
   wherein the Range-Doppler process comprises:
   transmitting a first train of mm wave single-slope chirps from the automotive vehicle, the first train having a first pulse repetition interval (PRI);
   receiving first mm reflected waves from the automotive target at the automotive vehicle in response to the first train;
   generating first signals in response to the first mm reflected waves;
   determining from the first signals a first plurality of possible velocities of the automotive target;
   transmitting a second train of mm wave single-slope chirps from the automotive vehicle, the second train having a second PRI different from the first PRI;
   receiving second mm reflected waves from the automotive target at the automotive vehicle in response to the second train;
   generating second signals in response to the second mm reflected waves;
   determining from the second signals a second plurality of possible velocities of the automotive target; and
   correlating the first and second pluralities of possible velocities to determine a true velocity of the automotive target.

17. A method for operating a forward-looking radar unit, comprising:
   providing a millimeter (mm) wave transceiver, which is adapted to transmit mm waves toward a target and to receive the mm waves reflected from the target so as to provide signals in response to the reflected waves, the transceiver having a first state in which the transceiver transmits and receives the mm waves in accordance with a Range-Doppler process, and a second state in which the transceiver transmits and receives the mm waves in accordance with a linear frequency modulated continuous wave (LFMCW) process; and coupling a processing module to the transceiver to process the signals so as to determine a position and a velocity of the target, the processing module being adapted, in response to the position and the velocity, to switch the transceiver between the first state and the second state, and comprising mounting the mm wave transceiver and the processing module within a unit that is adapted to be mounted on an automotive vehicle, and wherein the target comprises an automotive target, wherein the Range-Doppler process comprises:

transmitting a train of mm wave single-slop chirps having multiple frequencies from the automotive vehicle;

receiving reflected mm waves from the automotive targets in response to the chirp;

mixing the reflected mm waves with the frequencies of the chirps in order to determine beat frequencies;

performing a plurality of Fast Fourier Transforms (FFT) sequentially on the beat frequencies to determine transformed values; and determining the position and the velocity of the automotive target in response to the transformed values.

18. A method for operating a forward-looking radar unit, comprising:

providing a millimeter (mm) wave transceiver, which is adapted to transmit mm waves toward a target and to receive the mm waves reflected from the target so as to provide signals in response to the reflected waves, the transceiver having a first state in which the transceiver transmits and receives the mm waves in accordance with a Range-Doppler process, and a second state in which the transceiver transmits and receives the mm waves in accordance with a linear frequency modulated continuous wave (LFMCW) process; and coupling a processing module to the transceiver to process the signals so as to determine a position and a velocity of the target, the processing module being adapted, in response to the position and the velocity, to switch the transceiver between the first state and the second state, and comprising mounting the mm wave transceiver and the processing module within a unit that is adapted to be mounted on an automotive vehicle, and wherein the target comprises an automotive target, wherein the automotive target comprises a first and a second automotive target, and wherein the LFMCW process comprises:

transmitting toward the automotive targets a sequence of mm wave positive single-slope chirps, each of the chirps comprising multiple frequencies;

receiving reflected mm waves from the automotive targets in response to the chirps;

mixing the reflected mm waves with the frequencies of the chirps in order to determine beat frequencies; and determining a position and a velocity of the first automotive target and a position and a velocity of the second automotive target in response to the beat frequencies.

19. The method according to claim 18, wherein determining the position and velocity of the first and second automotive targets comprises maintaining a track file comprising the positions of the first and second automotive targets and determining the velocities of the first and second automotive targets by evaluating differences of the positions.

20. The method according to claim 19, wherein maintaining the track file comprises evaluating initial positions of the first and second automotive targets after an initial chirp comprised in the sequence of chirps, and evaluating subsequent positions of the first and second automotive targets after a subsequent chirp comprised in the sequence of chirps, and wherein determining the velocities comprises evaluating differences between the subsequent and the initial positions, and comparing the differences to a time between the initial and the subsequent chirp.

21. Apparatus for tracking a first and a second target, comprising:

an antenna assembly which is adapted to transmit toward the targets a sequence of millimeter (mm) wave chirps, each of the chirps comprising multiple frequencies and having substantially identical positive single-slopes, and to receive reflected mm waves from the targets in response to the chirps;

a radio frequency (RF) module which is adapted to mix the reflected mm waves with the frequencies of the chirps in order to determine beat frequencies; and a digital signal processor which is adapted to determine a position and a velocity of the first target and a position and a velocity of the second target in response to the beat frequencies, wherein transmitting the sequence of mm wave chirps comprises transmitting an initial chirp and a subsequent chirp, and wherein determining the position and the velocity of the first target and of the second target comprises determining an initial position of the first target and an initial position of the second target in response to the initial chirp, and determining a subsequent position of the first target and a subsequent position of the second target in response to the subsequent chirp, and determining the velocity of the first target in response to the initial position and subsequent position of the first target and the velocity of the second target in response to the initial position and subsequent position of the second target.

22. Apparatus for tracking a first and a second target, comprising:

an antenna assembly which is adapted to transmit toward the targets a sequence of millimeter (mm) wave chirps, each of the chirps comprising multiple frequencies and having substantially identical positive single-slopes, and to receive reflected mm waves from the targets in response to the chirps;

a radio frequency (RF) module which is adapted to mix the reflected mm waves with the frequencies of the chirps in order to determine beat frequencies; and a digital signal processor which is adapted to determine a position and a velocity of the first target and a position and a velocity of the second target in response to the beat frequencies, wherein determining the position and the velocity of the first target comprises maintaining a track file comprising a previous position and a previous velocity of the first target, and finding a predicted position and a predicted velocity of the first target in response to the previous position and the previous velocity, and comparing the predicted position and the predicted velocity with a resultant position and a resultant velocity of the first target determined from the beat frequencies.

* * * * *